(12) United States Patent
Sonobe

(10) Patent No.: US 10,484,896 B2
(45) Date of Patent: Nov. 19, 2019

(54) WIRELESS COMMUNICATION SYSTEM, WIRELESS COMMUNICATION APPARATUS, AND WIRELESS COMMUNICATION METHOD

(71) Applicant: NEC Corporation, Tokyo (JP)

(72) Inventor: Satoshi Sonobe, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/547,542

(22) PCT Filed: Jan. 5, 2016

(86) PCT No.: PCT/JP2016/000020
§ 371 (c)(1),
(2) Date: Jul. 31, 2017

(87) PCT Pub. No.: WO2016/132659
PCT Pub. Date: Aug. 25, 2016

(65) Prior Publication Data
US 2018/0027432 A1 Jan. 25, 2018

(30) Foreign Application Priority Data
Feb. 18, 2015 (JP) .................................. 2015-029316

(51) Int. Cl.
*H04W 24/04* (2009.01)
*H04B 1/74* (2006.01)
(Continued)

(52) U.S. Cl.
CPC .............. *H04W 24/04* (2013.01); *H04B 1/74* (2013.01); *H04L 1/22* (2013.01); *H04L 41/0668* (2013.01); *H04L 69/40* (2013.01)

(58) Field of Classification Search
CPC .......... H04B 1/74; H04B 10/03; H04B 10/07; H04W 24/04; H04L 1/22; H04L 41/0668;
(Continued)

(56) References Cited

U.S. PATENT DOCUMENTS 6,687,217 B1 * 2/2004 Chow .................. H04B 1/3805
370/217
2004/0228627 A1 * 11/2004 Alana ................ H04Q 11/0062
398/9

(Continued)

FOREIGN PATENT DOCUMENTS

JP 7-123106 A 5/1995
JP 7-336272 A 12/1995
(Continued)

OTHER PUBLICATIONS

International Search Report of PCT/JP2016/000020, dated Mar. 29, 2016. [PCT/ISA/210], 5 pages in English and Japanese.

*Primary Examiner* — Kyaw Z Soe
(74) *Attorney, Agent, or Firm* — Sughrue Mion, PLLC

(57) ABSTRACT

A wireless communication apparatus (10) includes: a switching control unit (103) that determines an active mode wireless communication apparatus at an opposite side based on a failure occurrence status of an active mode wireless communication apparatus at the opposite side under a situation that the wireless communication apparatus (10) is in the active mode; a wireless transmitting unit (101) that transmits a switch instruction to the opposite side under the situation that the wireless communication apparatus (10) is in the active mode, the switch instruction instructing the active mode wireless communication apparatus at the opposite side that is determined; and a wireless receiving unit (102) that receives the switch instruction from the opposite side, wherein the switching control unit (103) switches the wireless communication apparatus (10) to one of the active (Continued)

mode and the standby mode based on the switch instruction received from the opposite side.

14 Claims, 13 Drawing Sheets

(51) Int. Cl.
*H04L 1/22* (2006.01)
*H04L 12/24* (2006.01)
*H04L 29/14* (2006.01)

(58) Field of Classification Search
CPC ......... H04L 29/14; H04L 69/40; H04L 45/22; H04L 45/28; H04L 12/24
See application file for complete search history.

(56) References Cited

U.S. PATENT DOCUMENTS

| | | | |
|---|---|---|---|
| 2006/0056285 A1* | 3/2006 | Krajewski, III | ......... G05B 9/03 370/216 |
| 2007/0189154 A1* | 8/2007 | Hourtane | ................. H04L 12/42 370/218 |
| 2014/0143591 A1* | 5/2014 | Chiang | ............... G06F 11/2002 714/4.11 |
| 2016/0085560 A1* | 3/2016 | Gourlay | ................ G06F 9/4416 713/2 |
| 2016/0098327 A1* | 4/2016 | Detienne | ............... H04L 67/142 714/4.2 |
| 2016/0103698 A1* | 4/2016 | Yang | ..................... G06F 11/202 714/4.11 |

FOREIGN PATENT DOCUMENTS

| | | |
|---|---|---|
| JP | 2002-217791 A | 8/2002 |
| JP | 2014-147055 A | 8/2014 |
| WO | 2012/160826 A1 | 11/2012 |

\* cited by examiner

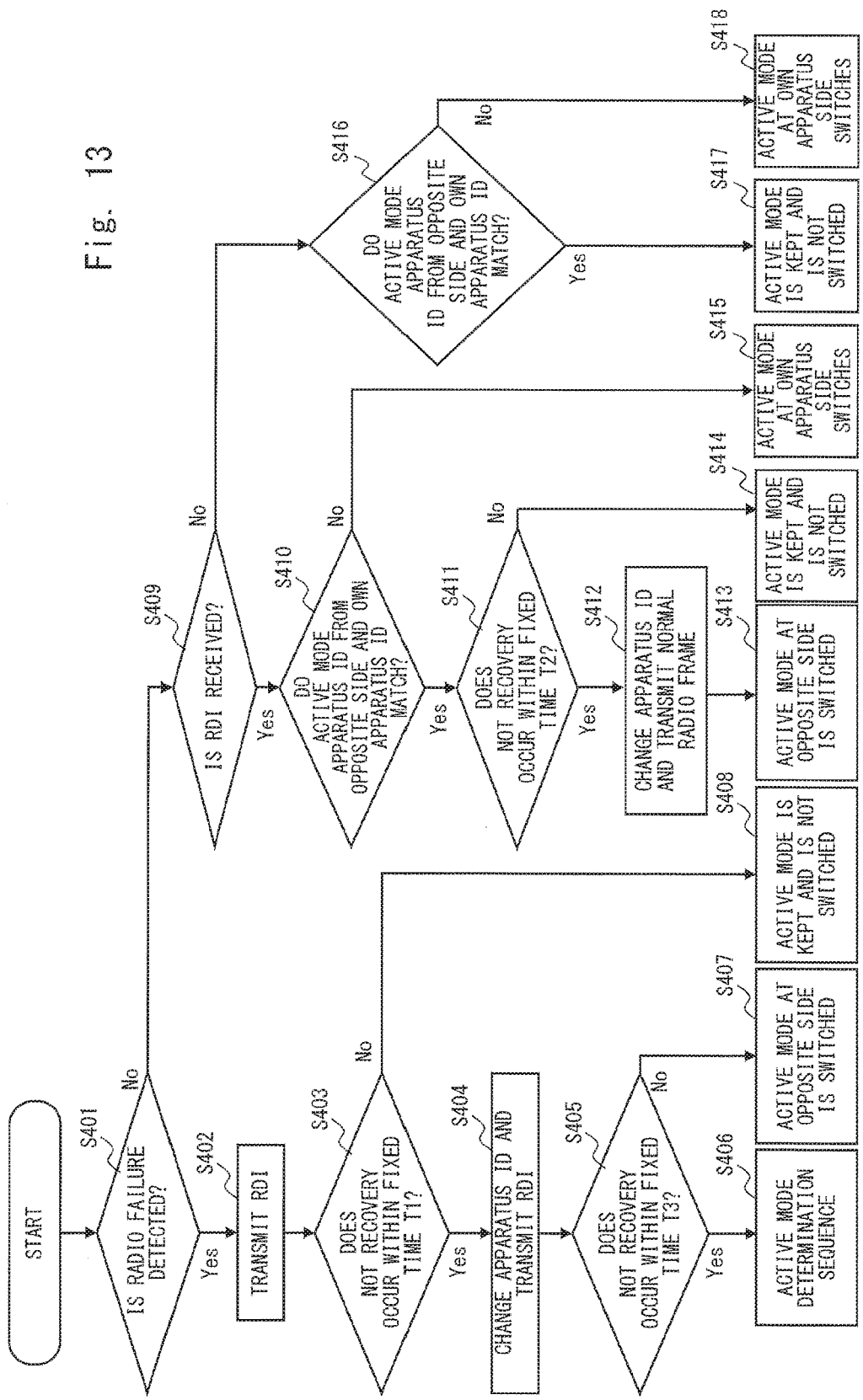

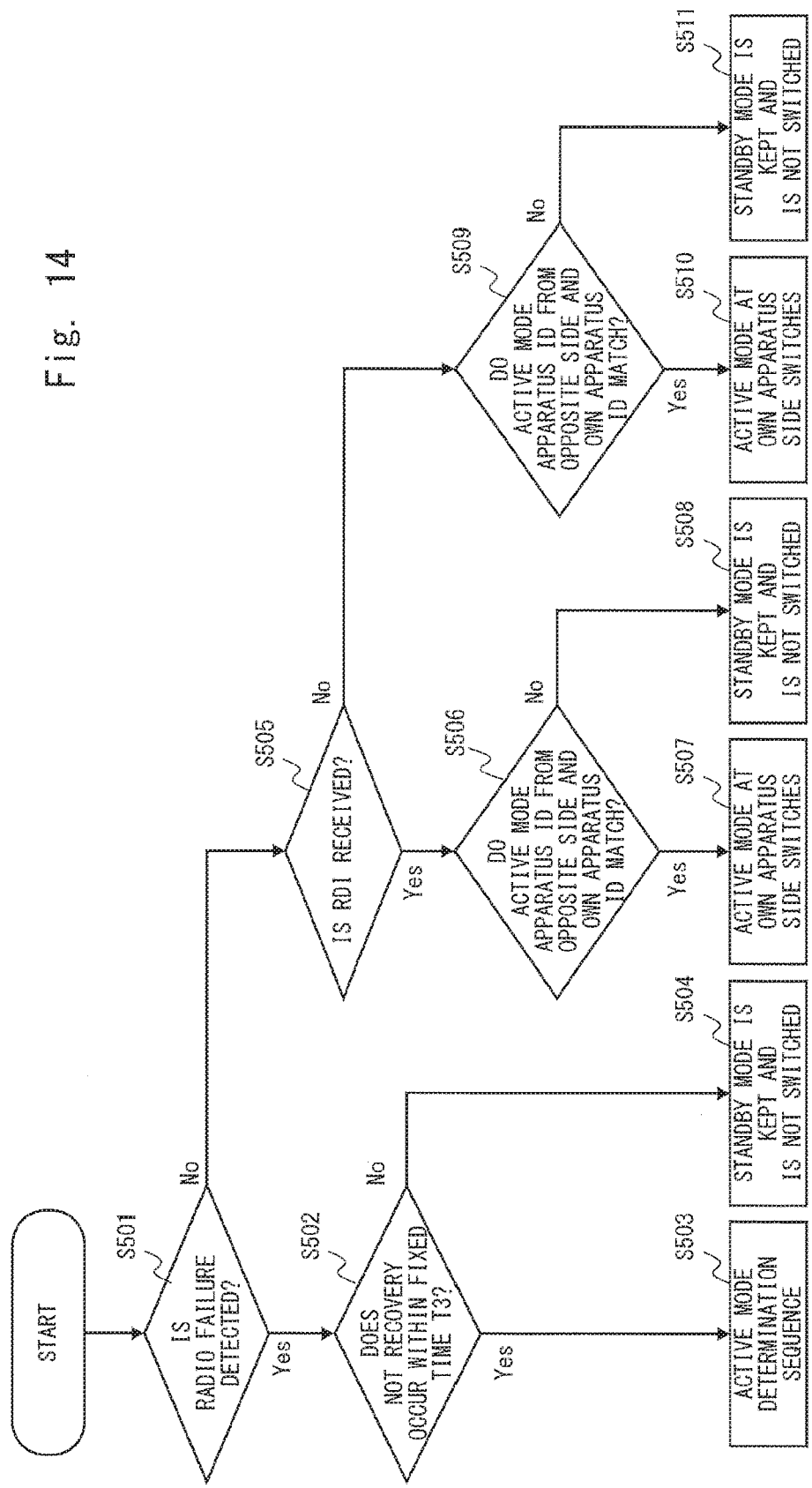

WIRELESS COMMUNICATION SYSTEM, WIRELESS COMMUNICATION APPARATUS, AND WIRELESS COMMUNICATION METHOD

CROSS REFERENCE TO RELATED APPLICATIONS

This application is a National Stage of International Application No. PCT/JP2016/000020 filed Jan. 5, 2016, claiming priority based on Japanese Patent Application No. 2015-029316, filed Feb. 18, 2015, the contents of all of which are incorporated herein by reference in their entirety.

TECHNICAL FIELD

The present invention relates to a wireless communication system, a wireless communication apparatus and a wireless communication method.

More particularly, the present invention relates to the wireless communication system, the wireless communication apparatus and the wireless communication method which redundantly configure two wireless communication apparatuses.

BACKGROUND ART

Some wireless communication systems which are required to provide high communication quality redundantly configure wireless communication apparatuses to suppress occurrences of packet loss and packet delay when a failure occurs in a wireless communication apparatus. For example, Patent Literature 1 discloses a technique of redundantly configuring two wireless communication apparatuses.

According to the technique disclosed in Patent Literature 1, the two wireless communication apparatuses are connected to a selecting apparatus, and a switching control unit in the selecting apparatus switches one of the two wireless communication apparatuses to an active mode apparatus and the other to a standby mode apparatus according to a failure occurrence status of the two wireless communication apparatuses. More specifically, when a failure occurs in the active mode apparatus, an opposite side active mode apparatus detects this failure and transmits failure information by radio. The active mode apparatus in which the failure has occurred cannot receive the failure information from the opposite side active mode apparatus, and therefore the standby mode apparatus receives the failure information and transmits the failure information to the selecting apparatus. Alternatively, the active mode apparatus itself detects the failure of the active mode apparatus and transmits failure information to the selecting apparatus. The switching control unit in the selecting apparatus receives the failure information and switches the current standby mode apparatus to the active mode apparatus.

CITATION LIST

Patent Literature

Patent Literature 1: International Patent Publication No. WO2012/160826

SUMMARY OF INVENTION

Technical Problem

However, the technique disclosed in Patent Literature 1 provides, as a dedicated controller, a switching control unit which performs control to switch between an active mode and a standby mode of the two wireless communication apparatuses in the selecting apparatus which is provided outside the wireless communication apparatus. Hence, there is a problem that a system configuration cannot be simplified and a problem that cost of the entire system is high. There is also a problem in terms of mounting in that it is necessary to dispose the wireless communication apparatuses near the selecting apparatus including the controller.

It is therefore one of the objects of the present invention to solve the above problems, and provide a wireless communication system, a wireless communication apparatus and a wireless communication method which can switch between an active mode and a standby mode of two wireless communication apparatuses without providing a dedicated controller outside the wireless communication apparatus.

Solution to Problem

In one exemplary aspect, a wireless communication system includes: first and second wireless communication apparatuses that are switched to one of an active mode and a standby mode; and third and fourth wireless communication apparatuses that are disposed opposite to the first and second wireless communication apparatuses via a radio link and are switched to one of the active mode and the standby mode. Each of the first to fourth wireless communication apparatuses transmits a switch instruction to the active mode and the standby mode wireless communication apparatuses at the opposite side based on a failure occurrence status of an active mode wireless communication apparatus at an opposite side disposed opposite to each of the own first to fourth wireless communication apparatuses via a radio link under a situation that each of the own first to fourth wireless communication apparatuses is in the active mode, the switch instruction instructing the active mode wireless communication apparatus at the opposite side, and switches each of the own first to fourth wireless communication apparatuses to one of the active mode and the standby mode based on the switch instruction received from the active mode wireless communication apparatus at the opposite side.

In one exemplary aspect, a first wireless communication apparatus is redundantly configured with another wireless communication apparatus and is switched to one of an active mode and a standby mode. The wireless communication apparatus includes: a switching control unit that determines an active mode wireless communication apparatus at an opposite side disposed opposite to the own wireless communication apparatus via a radio link based on a failure occurrence status of an active mode wireless communication apparatus at the opposite side under a situation that the own wireless communication apparatus is in the active mode; a wireless transmitting unit that transmits a switch instruction to active mode and standby mode wireless communication apparatuses at the opposite side under the situation that the own wireless communication apparatus is in the active mode, the switch instruction instructing the active mode wireless communication apparatus at the opposite side that is determined by the switching control unit; and a wireless receiving unit that receives the switch instruction from the active mode wireless communication apparatus at the opposite side. The switching control unit switches the own wireless communication apparatus to one of the active mode and the standby mode based on the switch instruction received from the active mode wireless communication apparatus at the opposite side.

In one exemplary aspect, a second wireless communication apparatus is redundantly configured with another wireless communication apparatus, is switched to one of an active mode and a standby mode and transmits a signal via radio link. The wireless communication apparatus includes: a switching control unit that detects a failure occurrence status of an active mode wireless communication apparatus at an opposite side disposed opposite to the own wireless communication apparatus via a radio link under a situation that the own wireless communication apparatus is in the active mode, and determines an active mode wireless communication apparatus at the opposite side based on the failure occurrence status; and a wireless transmitting unit that transmits a signal indicating the determined wireless communication apparatus via the radio link.

In one exemplary aspect, a first wireless communication is a method of a wireless communication system. The wireless communication system includes: first and second wireless communication apparatuses that are switched to one of an active mode and a standby mode; and third and fourth wireless communication apparatuses that are disposed opposite to the first and second wireless communication apparatuses via a radio link, and are switched to one of the active mode and the standby mode. The wireless communication method includes: at each of the first to fourth wireless communication apparatuses, transmitting a switch instruction to the active mode and standby mode wireless communication apparatuses at an opposite side disposed opposite to each of the own first to fourth wireless communication apparatuses via a radio link based on a failure occurrence status of an active mode wireless communication apparatus at the opposite side under a situation that each of the own first to fourth wireless communication apparatuses is in the active mode, the switch instruction instructing the active mode wireless communication apparatus at the opposite side; and causing each of the first to fourth wireless communication apparatuses to switch to one of the active mode and the standby mode based on the switch instruction received from the active mode wireless communication apparatus at the opposite side.

In one exemplary aspect, a second wireless communication method is a method of a wireless communication apparatus that is redundantly configured with another wireless communication apparatus and is switched to one of an active mode and a standby mode. The wireless communication method includes: transmitting a switch instruction to active mode and standby mode wireless communication apparatuses at an opposite side disposed opposite to the own wireless communication apparatus via a radio link based on a failure occurrence status of an active mode wireless communication apparatus at the opposite side under a situation that the own wireless communication apparatus is in the active mode, the switch instruction instructing the active mode wireless communication apparatus at the opposite side; and causing the own wireless communication apparatus to switch to one of the active mode and the standby mode based on the switch instruction received from the active mode wireless communication apparatus at the opposite side.

Advantageous Effects of Invention

According to the above aspect, it is possible to provide an effect that it is possible to switch between an active mode and a standby mode of wireless communication apparatuses without providing a dedicated controller outside the wireless communication apparatuses.

BRIEF DESCRIPTION OF DRAWINGS

FIG. 13 is a flow chart illustrating an operation example in case where a wireless communication apparatus according to a second embodiment is in the active mode.

FIG. 14 is a flow chart illustrating an operation example in case where a wireless communication apparatus according to a second embodiment is in the standby mode.

DESCRIPTION OF EMBODIMENTS

Embodiments of the present invention will be described with reference to the drawings below.

(1) First Embodiment

Figure 1:
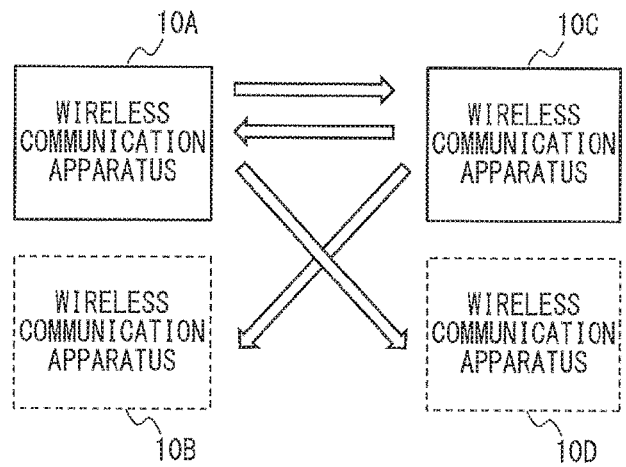
FIG. 1 is a view illustrating a configuration example of a wireless communication system according to a first embodiment.

FIG. 1 illustrates a configuration example of a wireless communication system according to the present embodiment. The wireless communication system illustrated in FIG. 1 includes wireless communication apparatuses 10A and 10B which are switched to an active mode and a standby mode and employ redundant configurations, and wireless communication apparatuses 10C and 10D which are disposed opposite to the wireless communication apparatuses 10A and 10B via a radio link, are switched to the active mode or the standby mode and employ redundant configurations. Hereinafter, the wireless communication apparatuses 10A to 10D which are not specified will be optionally referred to as a wireless communication apparatus 10. Further, the wireless communication apparatus 10 which is disposed opposite to the given wireless communication apparatus 10 via a radio link will be referred to as the opposite side wireless communication apparatus 10. The wireless communication apparatuses 10A to 10D each include a wireless communication function of performing wireless communication with the opposite side wireless communication apparatus 10. The wireless communication apparatuses 10A to 10D transmit and receive radio signals under a situation that the own wireless communication apparatuses 10A to 10D are in the active mode. Meanwhile, the wireless communication apparatuses 10A to 10D stop transmitting radio signals (radio mute state) and only receive radio signals under a situation that the own wireless communication apparatuses 10A to 10D are in the standby mode. Further, when the own wireless communication apparatuses 10A to 10D are both in the active mode and the standby mode too, the wireless communication apparatuses 10A to 10D transmit and receive radio signals by using the same frequency. In this regard, FIG. 1 illustrates the active mode wireless communication apparatuses 10 (the wireless communication apparatuses 10A and 10C in FIG. 1) by solid lines, and illustrates the standby mode wireless communication apparatuses 10 (the wireless communication apparatuses 10B and 10D in FIG. 1) by broken lines (the same applies to following FIGS. 2 to 4, 6, 8 and 11).

Figure 2:
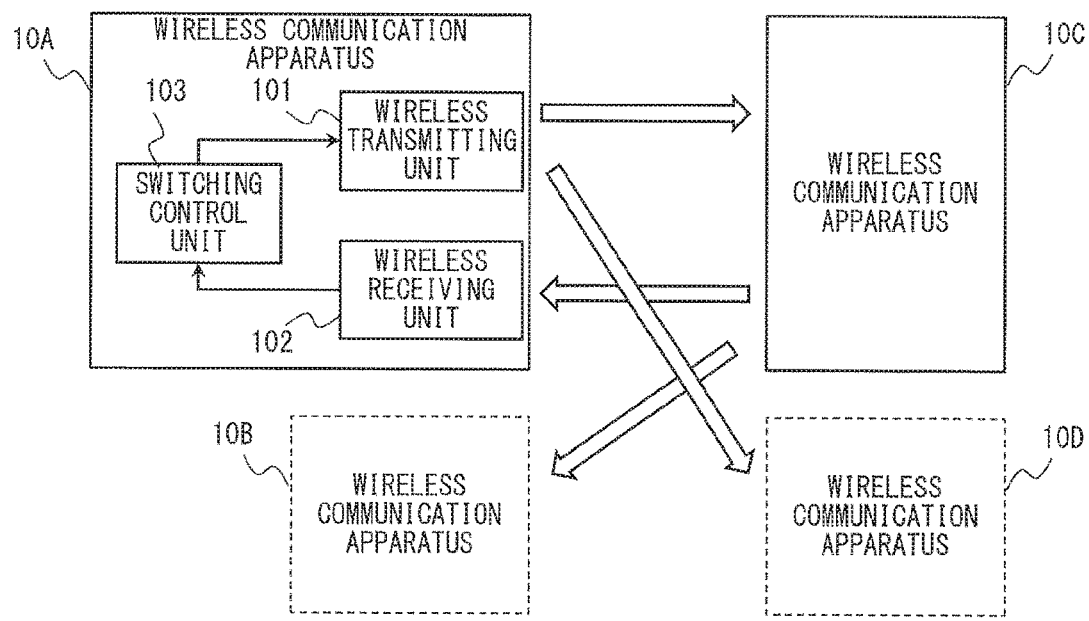
FIG. 2 is a view illustrating a configuration example of a wireless communication apparatus according to a first embodiment.

FIG. 2 illustrates a configuration example of the wireless communication apparatus 10A according to the present embodiment. In this regard, configurations of the wireless communication apparatuses 10B to 10D are the same as the configuration of the wireless communication apparatus 10A. The wireless communication apparatus 10A illustrated in FIG. 2 includes a wireless receiving unit 102 which receives radio signals from the opposite side wireless communication apparatuses 10C and 10D, a unit 102 wireless transmitting unit 101 which transmits radio signals to the opposite side wireless communication apparatuses 10C and 10D, and a switching control unit 103 which performs control for switching the wireless communication apparatus 10A between the active mode and the standby mode. The switching control unit 103 detects a failure occurrence status of the active mode wireless communication apparatus among the opposite side wireless communication apparatuses 10C and 10D under a situation that the wireless communication apparatus 10A is in the active mode, and determines the active mode wireless communication apparatus 10 at the opposite side based on the detected failure occurrence status. The wireless transmitting unit 101 transmits a radio signal indicating the active wireless communication apparatus 10 at the opposite side, to the opposite side active mode and standby mode wireless communication apparatuses 10. This radio signal is transmitted to the opposite side as a switch instruction for instructing the active mode wireless communication apparatus 10 at the opposite side. Further, when the switch instruction from the opposite side active mode wireless communication apparatus 10 is received, the switching control unit 103 checks the wireless communication apparatus 10 instructed by this switch instruction, and switches the wireless communication apparatus 10A to the active mode or the standby mode based on this check result. More specifically, the switching control unit 103 keeps the active mode of the wireless communication apparatus 10A when the wireless communication apparatus 10A is instructed, and switches the wireless communication apparatus 10A from the active mode to the standby mode when the wireless communication apparatus 10B is instructed under the situation that the wireless communication apparatus 10A is in the active mode. Meanwhile, the switching control unit 103 switches the wireless communication apparatus 10A from the standby mode to the active mode when the wireless communication apparatus 10A is instructed, and keeps the standby mode of the wireless communication apparatus 10A when the wireless communication apparatus 10B is instructed under the situation that the wireless communication apparatus 10A is in the standby mode.

As described above, in the present embodiment, the wireless communication apparatuses 10A to 10D transmit the switch instruction for instructing the active mode wireless communication apparatus 10 at the opposite side to the opposite side active mode and standby mode wireless communication apparatuses 10 based on a failure occurrence status of the opposite side active mode wireless communication apparatus 10 under the situation that the own wireless communication apparatuses 10A to 10D are in the active mode. Further, the wireless communication apparatuses 10A to 10D switch to the active mode or the standby mode based on the switch instruction received from the opposite side active mode wireless communication apparatus 10.

Consequently, unlike the technique disclosed in Patent Literature 1, in the present embodiment, it is possible to switch between an active mode and a standby mode of the wireless communication apparatuses 10A to 10D without providing a dedicated controller outside the wireless communication apparatuses 10A to 10D.

(2) Second Embodiment (2-1) Configuration According to Second Embodiment

Figure 3:
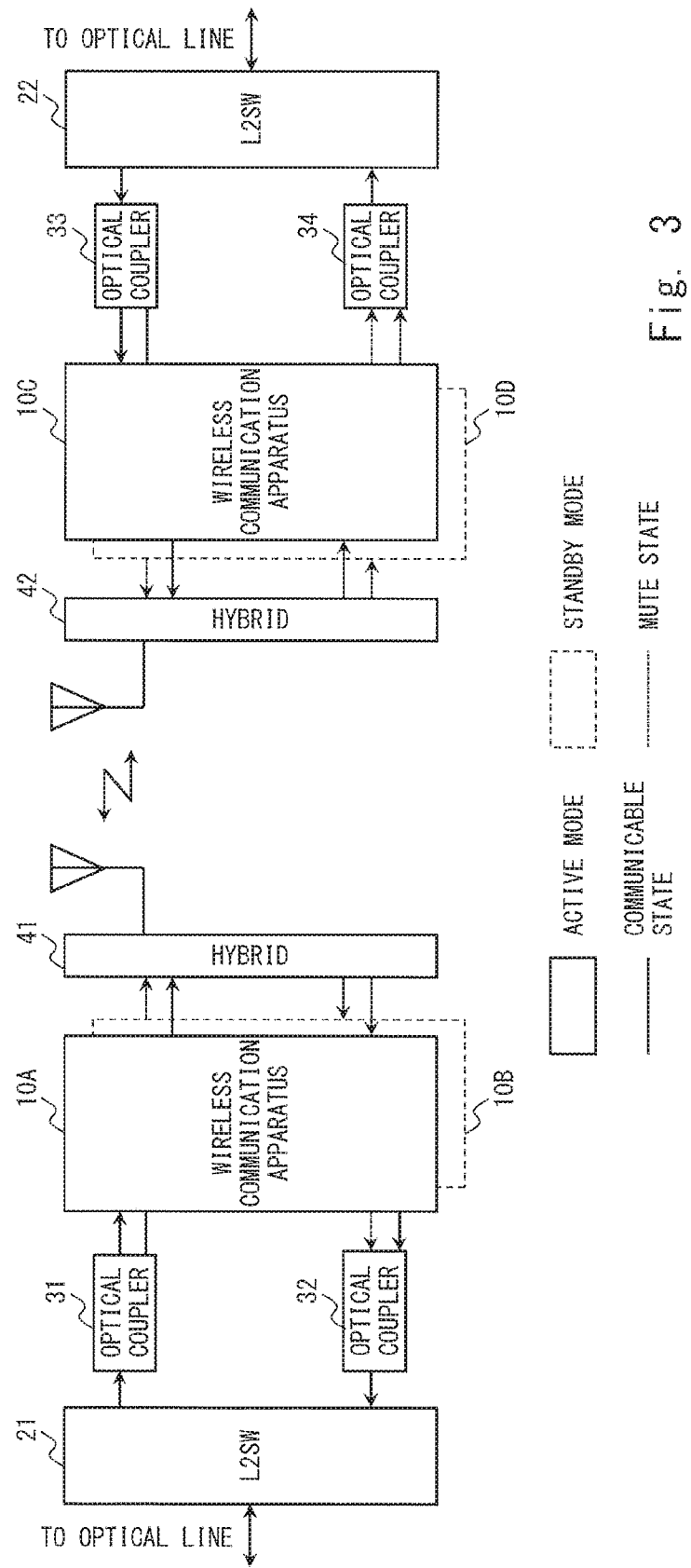
FIG. 3 is a view illustrating a configuration example of a wireless communication system according to a second embodiment.

In the present embodiment, a configuration and an operation according to the first embodiment are embodied more. FIG. 3 illustrates a configuration example of a wireless communication system according to the present embodiment. FIG. 3 shows an example where, in the wireless communication system, wireless communication apparatuses 10A to 10D are connected to optical lines as a wired network. Compared to the wireless communication system illustrated in FIG. 1, the wireless communication system illustrated in FIG. 3 additionally includes a L2SW (Layer 2 switch) 21, optical couplers 31 and 32 and a hybrid 41 at a side of the wireless communication apparatuses 10A and 10B, and a L2SW 22, optical couplers 33 and 34 and a hybrid 42 at a side of the wireless communication apparatuses 10C and 10D. The L2SWs 21 and 22 are connected to the optical lines and receive and transmit optical signals. The optical couplers 31 to 34 split and couple the optical signals. The hybrids 41 and 42 split and couple radio signals. The wireless communication apparatuses 10A to 10D each include a wireless communication function and, in addition, an optical communication function. The wireless communication apparatuses 10A to 10D transmit and receive the radio signals and the optical signals when the own wireless communication apparatuses 10A to 10D are in the active mode. Meanwhile, the wireless communication apparatuses 10A to 10D stop transmitting the radio signals and the optical signals (a radio mute state and an optical mute state) and only receive the radio signals and the optical signals when the own wireless communication apparatuses 10A to 10D are in the standby mode. Further, the wireless communication apparatuses 10A to 10D transmit and receive the radio signals by using the same frequency when the own wireless communication apparatuses 10A to 10D are in the active mode and the standby mode, too. In this regard, in FIG. 3, regarding each signal line between components, each signal line in a communicable state is indicated by a solid line, and each signal line in a mute state is indicated by a dotted line (the same applies to following FIGS. 4, 6, 8 and 11).

Figure 4:
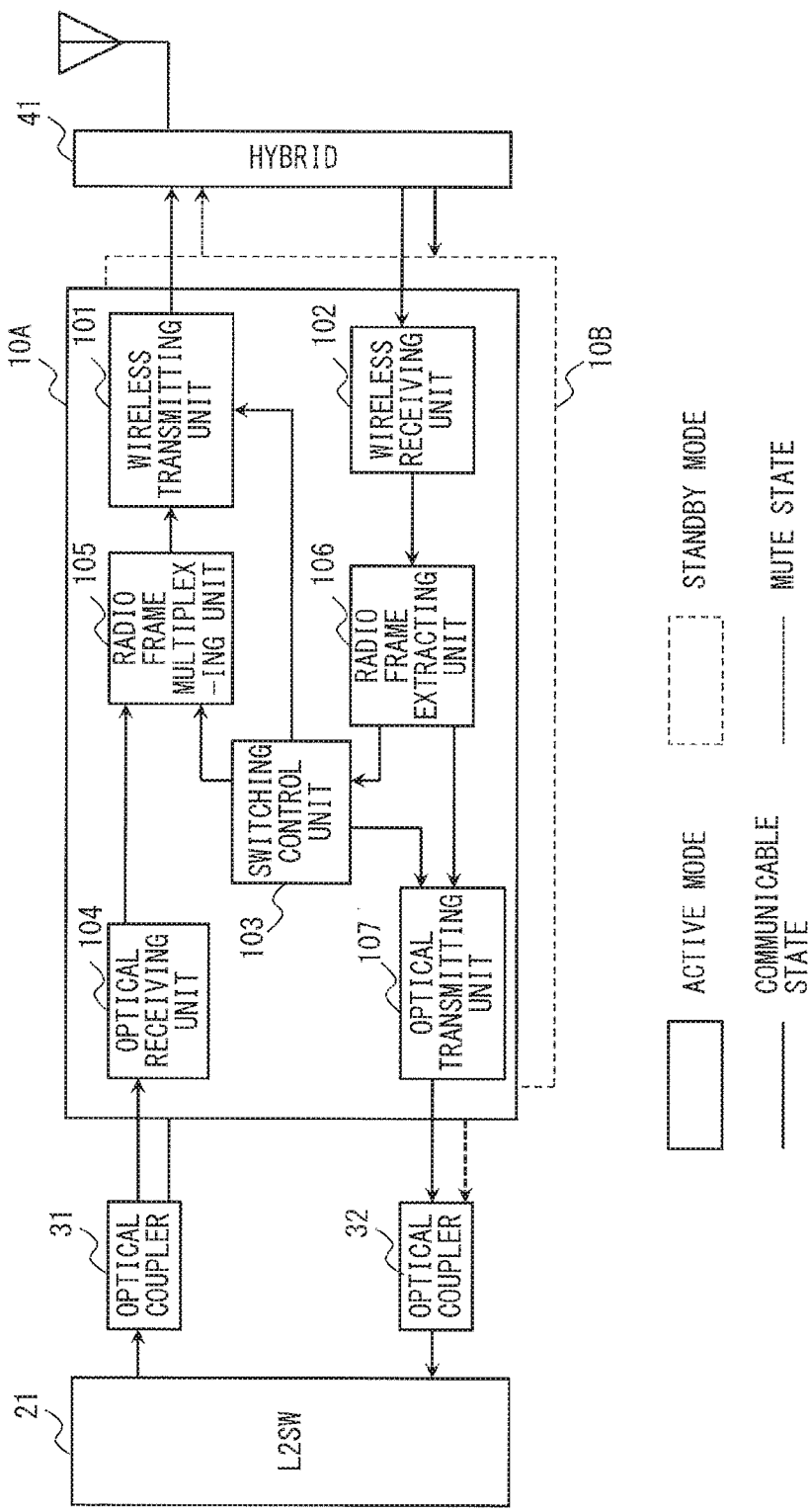
FIG. 4 is a view illustrating a configuration example of a wireless communication apparatus according to a second embodiment.

FIG. 4 illustrates a configuration example of the wireless communication apparatus 10A according to the present embodiment. In this regard, configurations of the wireless communication apparatuses 10B to 10D are also the same as the configuration of the wireless communication apparatus 10A. The wireless communication apparatus 10A illustrated in FIG. 4 includes an optical receiving unit 104, a radio frame multiplexing unit 105, a radio frame extracting unit 106 and an optical transmitting unit 107 compared to the wireless communication apparatus 10A illustrated in FIG. 2. The optical receiving unit 104 receives optical signals via the optical coupler 31 from the optical line. Under control of a switching control unit 103, the radio frame multiplexing unit 105 rearranges data included in the optical signal from the optical receiving unit 104 to a radio frame, and multiplexes on the radio frame a switch instruction for instructing the active wireless communication apparatus 10 at the opposite side. In the present embodiment, an apparatus ID (IDentifier) of the active mode wireless communication apparatus 10 is multiplexed as the switch instruction. A wireless transmitting unit 101 transmits the radio frame from the radio frame multiplexing unit 105 to the opposite side active mode and standby mode wireless communication apparatuses 10 under a situation that the wireless communication apparatus 10A is in the active mode. In this regard, under a situation that the wireless communication apparatus 10A is in the standby mode, the wireless transmitting unit 101 stops transmitting radio frames under control of the switching control unit 103.

A wireless receiving unit 102 receives a radio frame from the opposite side active mode wireless communication apparatus 10. The radio frame extracting unit 106 extracts data and a switch instruction from the radio frame from the wireless receiving unit 102. The optical transmitting unit 107 rearranges data from the radio frame extracting unit 106 to an optical signal and transmits the optical signal to the optical line via the optical coupler 32 under the situation that the wireless communication apparatus 10A is in the active mode. In this regard, when the wireless communication apparatus 10A is in the standby mode, the optical transmitting unit 107 stops transmitting optical signals under control of the switching control unit 103.

Further, the switching control unit 103 causes the radio frame multiplexing unit 105 to generate RDI (Remote Defect Indication) frames as radio frames when detecting a failure of the wireless transmitting unit 101 of the opposite side active mode wireless communication apparatus 10, when detecting a failure of the wireless receiving unit 102 of the wireless communication apparatus 10A and when detecting a failure of a radio link under the situation that the wireless communication apparatus 10A is in the active mode. Consequently, it is possible to notify the opposite side active mode and standby mode wireless communication apparatuses 10 of a failure occurrence alarm. In this regard, a radio frame to be transmitted during a normal time will be referred to as a normal radio frame below to distinguish from a RDI frame. Further, the failure may be detected by the switching control unit 103 or a failure detecting unit by providing the failure detecting unit (not illustrated) in the wireless communication apparatus 10A. Furthermore, the switching control unit 103 determines the active mode wireless communication apparatus 10 at the opposite side based on the failure occurrence status of the opposite side active mode wireless communication apparatus 10, and causes the radio frame multiplexing unit 105 to multiplex an apparatus ID of the determined wireless communication apparatus 10 on a radio frame under the situation that the wireless communication apparatus 10A is in the active mode. For example, it is determined that, in a default state, the default wireless communication apparatus 10 set in advance among the opposite side wireless communication apparatuses 10C and 10D is in the active mode, and it is determined that, when a failure occurs in this active mode wireless communication apparatus 10 and does not recover within a fixed time, the wireless communication apparatus 10 which is in the standby mode at this point of time is switched to the active mode.

Further, when receiving the radio frame from the opposite side active mode wireless communication apparatus 10, the switching control unit 103 checks the apparatus ID multiplexed on this radio frame, and switches the wireless communication apparatus 10A to the active mode or the standby mode based on this check result. More specifically, the switching control unit 103 keeps the active mode of the wireless communication apparatus 10A when the wireless communication apparatus 10A is instructed, and switches the wireless communication apparatus 10A from the active mode to the standby mode when the wireless communication apparatus 10B is instructed under the situation that the wireless communication apparatus 10A is in the active mode. Meanwhile, the switching control unit 103 switches the wireless communication apparatus 10A from the standby mode to the active mode when the wireless communication apparatus 10A is instructed, and keeps the standby mode of the wireless communication apparatus 10A when the wireless communication apparatus 10B is instructed under the situation that the wireless communication apparatus 10A is in the standby mode.

Thus, the switching control unit 103 switches between the active mode and the standby mode of the wireless communication apparatus 10A based on the apparatus ID multiplexed on this radio frame while the switching control unit 103 can receive the radio frame from the opposite side active mode wireless communication apparatus 10. However, when a failure occurs in the radio link, the switching control unit 103 cannot receive radio frames from the opposite side active mode wireless communication apparatus 10. Hence, when detecting that a failure has occurred in the radio link, the switching control unit 103 keeps the active mode of the wireless communication apparatus 10A under the situation that the wireless communication apparatus 10A is in the active mode, and switches the wireless communication apparatus 10A to the active mode under the situation that the wireless communication apparatus 10A is in the standby mode. The same applies to the wireless communication apparatus 10B, too. Hence, when the failure occurs in the radio link, the wireless communication apparatuses 10A and 10B transition to a both mode active state where the wireless communication apparatuses 10A and 10B are in the active mode. Further, when the failure of the radio link subsequently recovers and the switching control unit 103 can receive radio frames from the opposite side active mode wireless communication apparatus 10, the switching control unit 103 switches between the active mode and the standby mode of the wireless communication apparatus 10A based on the apparatus ID multiplexed on this radio frame. Thus, one of the wireless communication apparatuses 10A and 10B is in the standby mode, so that the both mode active state is resolved.

(2-2) Operation According to Second Embodiment

The operation according to the present embodiment will be described. Communication from a side of the wireless communication apparatuses 10A and 10B to a side of the wireless communication apparatuses 10C to 10D will be referred to as downlink, and communication in a reverse direction will be referred to as uplink. Hereinafter, it is assumed that a switching control unit 103 detects an occurrence of a failure.

(2-2-1) Operation of Wireless Communication System (A) Operation in Case where Failure Occurs in Wireless Transmitting Unit 101 of Active Mode Wireless Communication Apparatus 10

Figure 5:
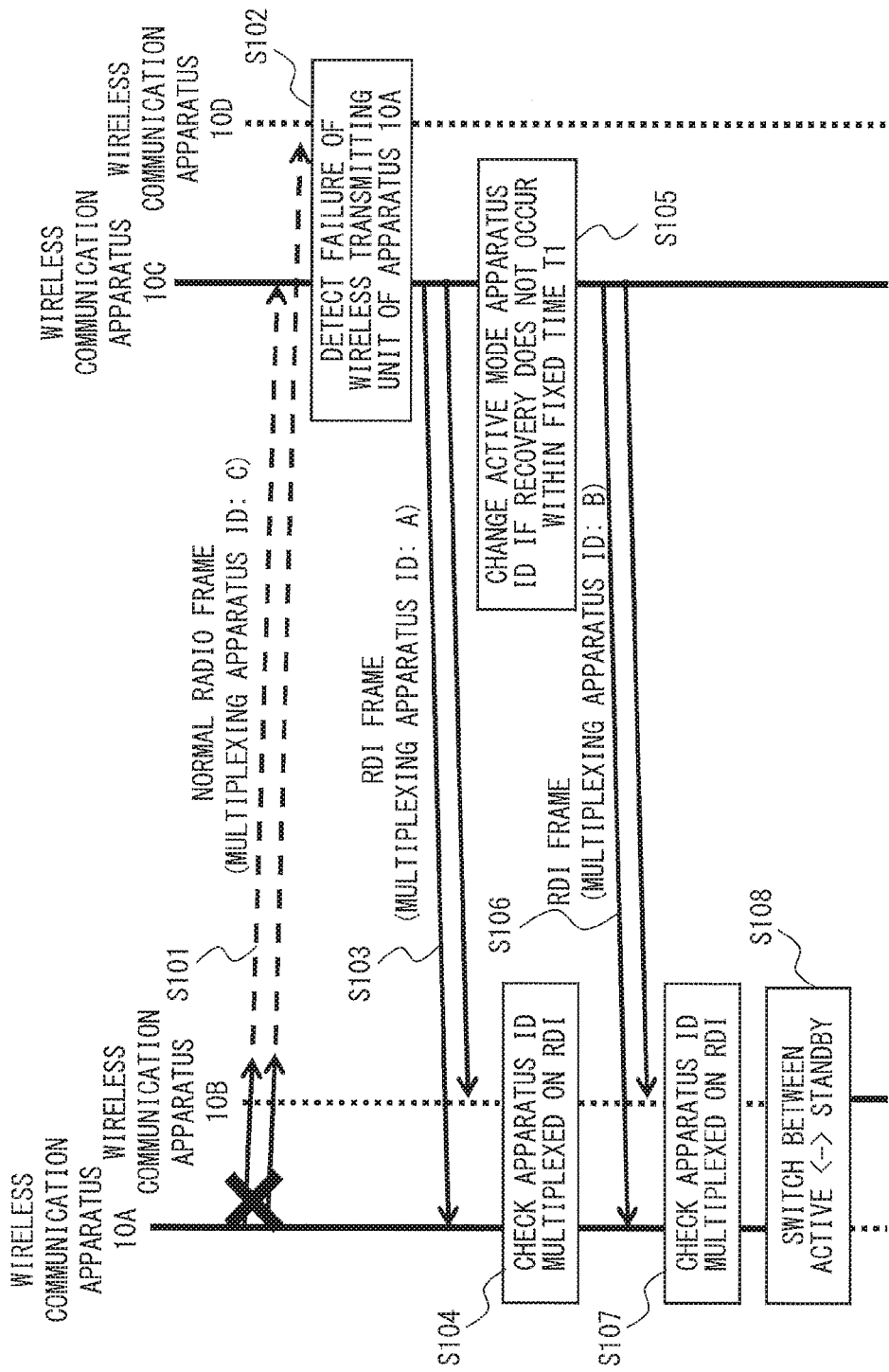
FIG. 5 is a sequence chart illustrating an operation example in case where a failure occurs in a wireless transmitting unit of an active mode wireless communication apparatus in a wireless communication system according to a second embodiment.
Figure 6:
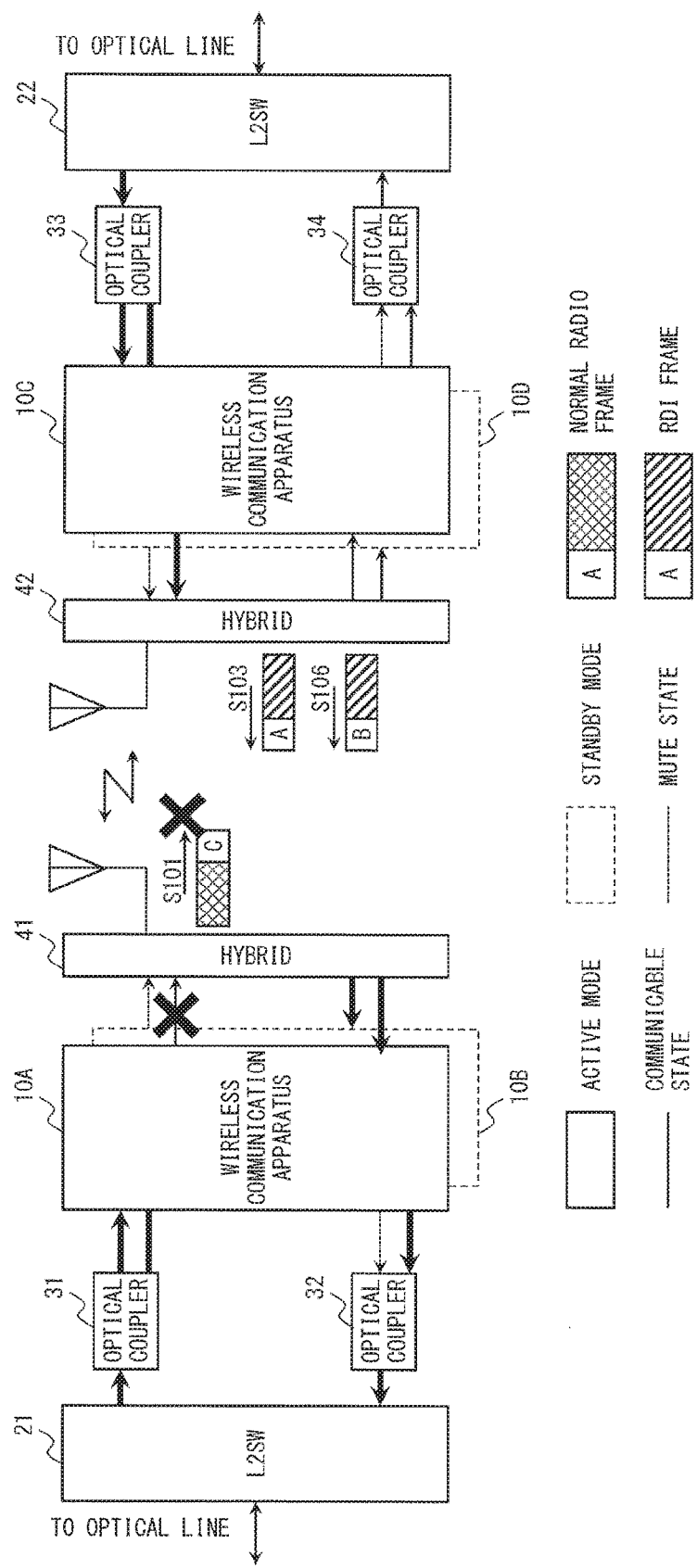
FIG. 6 is a view illustrating an operation example in case where a failure occurs in a wireless transmitting unit of an active mode wireless communication apparatus in a wireless communication system according to a second embodiment.

FIGS. 5 and 6 illustrate operation examples where a failure occurs in the wireless transmitting unit 101 of the active mode wireless communication apparatus 10A under a situation that the wireless communication apparatuses 10A and 10C are in the active mode and the wireless communication apparatuses 10B and 10 are in the standby mode. In this regard, the same steps will be assigned the same reference numerals in FIGS. 5 and 6. Further, in FIG. 5, the wireless communication apparatuses 10A to 10D are indicated by solid lines in a state of the active mode, and are indicated by broken lines in a state of the standby mode (the same applies to subsequent FIGS. 7, 9 and 10). Further, in FIG. 6, letters assigned to a normal radio frame and RDI frames indicate apparatus IDs multiplexed on radio frames of the normal radio frame and the RDI frames (the same applies to subsequent FIGS. 8 and 11). Furthermore, in FIGS. 5 and 6, the apparatuses IDs of the wireless communication apparatuses 10A, 10B, 10C and 10D are A, B, C and D, respectively (the same applies to subsequent FIGS. 7 to 12). Still further, it is assumed hereinafter that the wireless communication apparatuses 10A and 10B, and the wireless communication apparatuses 10C and 10D transmit and receive radio frames to and from each other at all times even in a state where there is no data from the L2SWs 21 and 22.

Referring to FIGS. 5 and 6, the wireless transmitting unit 101 of the currently active mode wireless communication apparatus 10A transmits a normal radio frame on which the apparatus ID "C" of the currently opposite side active mode wireless communication apparatus 10C is multiplexed, to the opposite side wireless communication apparatuses 10C and 10D (step S101). However, the failure occurs in the wireless transmitting unit 101 of the wireless communication apparatus 10A, and the normal radio frame transmitted from the wireless communication apparatus 10A in step S101 does not reach the wireless communication apparatuses 10C and 10D.

When a preset time passes after a radio frame is lastly received from the wireless communication apparatus 10A, and the failure does not occur in the wireless receiving unit 102 in each of the own wireless communication apparatuses 10C and 10D, the switching control unit 103 of each of the wireless communication apparatuses 10C and 10D detects the occurrence of the failure in the wireless transmitting unit 101 of the opposite side active mode wireless communication apparatus 10A (step S102). Then, the wireless transmitting unit 101 of the active mode wireless communication apparatus 10C transmits a RDI frame for notifying a failure occurrence alarm in downlink, to the opposite side wireless communication apparatuses 10A and 10B (step S103). In this regard, the apparatus ID to be multiplexed on the RDI frame is still the apparatus ID "A" of the currently opposite side active mode wireless communication apparatus 10A. When receiving the RDI frame from the opposite side active mode wireless communication apparatus 10C, the switching control unit 103 of each of the wireless communication apparatuses 10A and 10B checks the apparatus ID multiplexed on this RDI frame (step S104). In this regard, the apparatus ID "A" of the currently active mode wireless communication apparatus 10A is multiplexed on the RDI frame, and therefore the switching control unit 103 of each of the wireless communication apparatuses 10A and 10B is not switched between the active mode and the standby mode.

Meanwhile, the switching control unit 103 of the wireless communication apparatus 10C decides whether or not the failure has recovered within a preset fixed time T1 after detection of the failure of the wireless transmitting unit 101 of the opposite side active mode wireless communication apparatus 10A. In this case, the failure does not recover within the fixed time T1. Hence, the switching control unit 103 of the wireless communication apparatus 10C determines to switch the opposite side active mode apparatus from the wireless communication apparatus 10A to the wireless communication apparatus 10B. Further, the switching control unit 103 of the wireless communication apparatus 10C changes the apparatus ID multiplexed on the RDI frame to the apparatus ID "B" of the wireless communication apparatus 10B (step S105), and the wireless transmitting unit 101 of the wireless communication apparatus 10C transmits this RDI frame to the opposite side wireless communication apparatuses 10A and 10B (step S106). When receiving the RDI frame from the opposite side active mode wireless communication apparatus 10C, the switching control unit 103 of each of the wireless communication apparatuses 10A and 10B checks the apparatus ID multiplexed on this RDI frame (step S107). In this case, the apparatus ID "B" of the currently standby mode wireless communication apparatus 10B is multiplexed on the RDI frame. Hence, the switching control unit 103 of the wireless communication apparatus 10A switches the own wireless communication apparatus 10A to the standby mode, and the switching control unit 103 of the wireless communication apparatus 10B switches the own wireless communication apparatus 10B to the active mode (step S108).

As described above, when the failure occurs in the wireless transmitting unit 101 of the active mode wireless communication apparatus 10A, it is possible to switch the wireless communication apparatus 10A to the standby mode and switch the wireless communication apparatus 10B to the active mode.

(B) Operation in Case where Failure Occurs in Wireless Receiving Unit 102 of Active Mode Wireless Communication Apparatus 10

Figure 7:
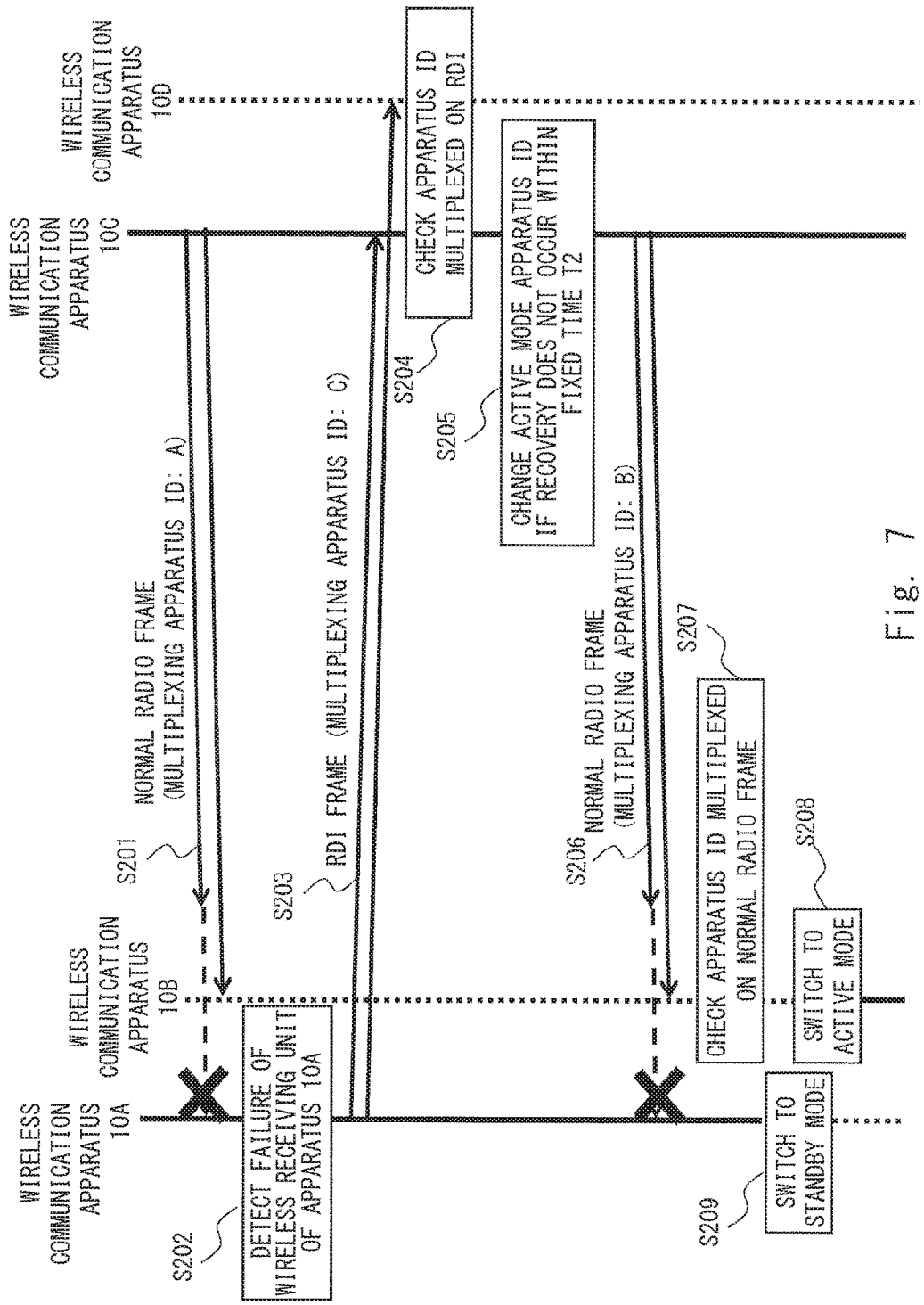
FIG. 7 is a sequence chart illustrating an operation example in case where a failure occurs in a wireless receiving unit of an active mode wireless communication apparatus in a wireless communication system according to a second embodiment.
Figure 8:
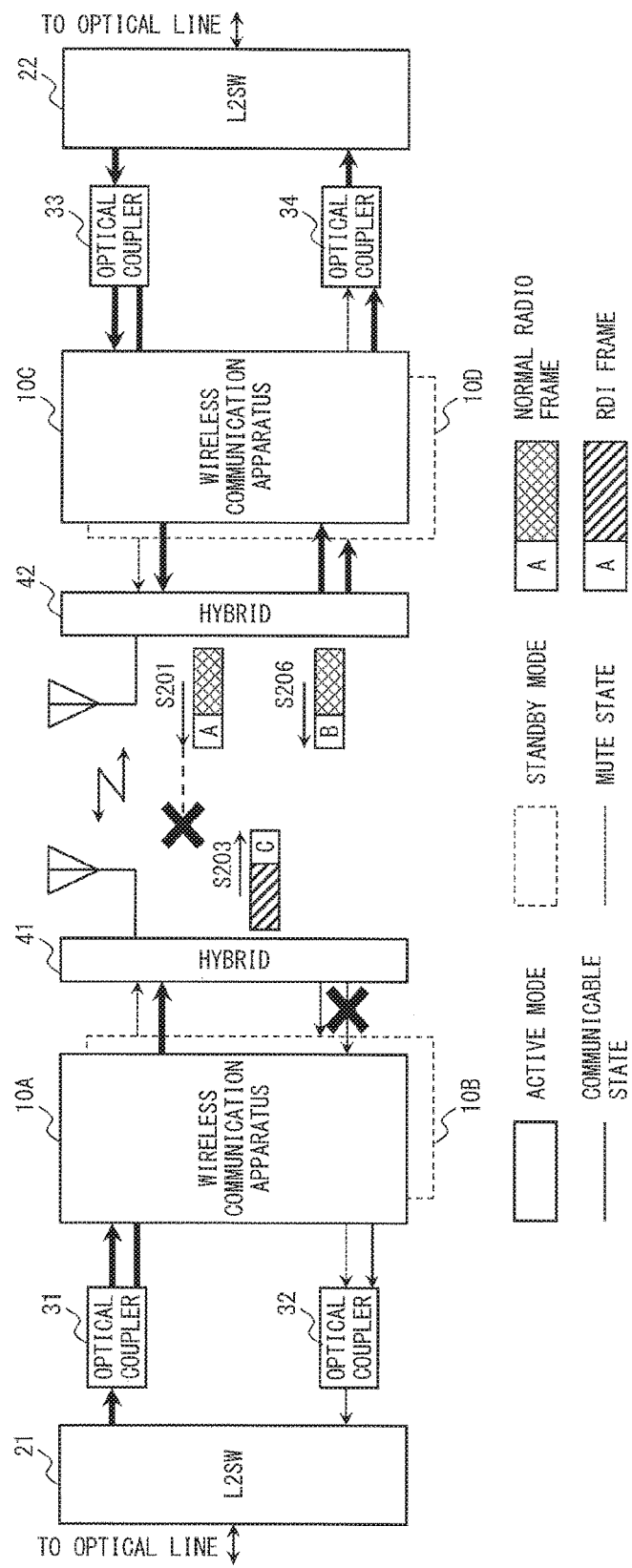
FIG. 8 is a view illustrating an operation example in case where a failure occurs in a wireless receiving unit of an active mode wireless communication apparatus in a wireless communication system according to a second embodiment.

FIGS. 7 and 8 illustrate operation examples where the failure occurs in the wireless receiving unit 102 of the active mode wireless communication apparatus 10A under a situation that the wireless communication apparatuses 10A and 10C are in the active mode and the wireless communication apparatuses 10B and 10D are in the standby mode.

Referring to FIGS. 7 and 8, the wireless transmitting unit 101 of the currently active mode wireless communication apparatus 10C transmits the normal radio frame on which the apparatus ID "A" of the currently opposite side active mode wireless communication apparatus 10A is multiplexed, to the opposite side wireless communication apparatuses 10A and 10B (step S201). However, the failure occurs in the wireless receiving unit 102 of the wireless communication apparatus 10A, and the wireless communication apparatus 10A does not receive the normal radio frame transmitted from the wireless communication apparatus 10C in step S201.

The switching control unit 103 of the wireless communication apparatus 10A detects the occurrence of the failure in the wireless receiving unit 102 of the wireless communication apparatus 10A (step S202). Then, the wireless transmitting unit 101 of the wireless communication apparatus 10A transmits a RDI frame for notifying a failure occurrence alarm in uplink, to the opposite side wireless communication apparatuses 10C and 10D (step S203). The apparatus ID to be multiplexed on the RDI frame is still the apparatus ID "C" of the currently opposite side active mode wireless communication apparatus 10C. When receiving the RDI frame from the opposite side active mode wireless communication apparatus 10A, the switching control unit 103 of each of the wireless communication apparatuses 10C and 10D checks the apparatus ID multiplexed on this RDI frame (step S204). In this case, the apparatus ID "C" of the currently active mode wireless communication apparatus 10C is multiplexed on the RDI frame, and therefore the switching control unit 103 of each of the wireless communication apparatuses 10C and 10D does not switch between the active mode and the standby mode.

Further, the switching control unit 103 of the wireless communication apparatus 10C decides whether or not the normal radio frame indicating recovery of the failure has been received within a preset fixed time T2 (T2<T1) after the RDI frame is received from the opposite side active mode wireless communication apparatus 10A. In this case, the failure does not recover within the fixed time T2. Hence, the switching control unit 103 of the wireless communication apparatus 10C determines to switch the opposite side active mode apparatus from the wireless communication apparatus 10A to the wireless communication apparatus 10B. Further, the switching control unit 103 of the wireless communication apparatus 10C changes the apparatus ID multiplexed on the normal radio frame to the apparatus ID "B" of the wireless communication apparatus 10B (step S205), and the wireless transmitting unit 101 of the wireless communication apparatus 10C transmits this normal radio frame to the opposite side wireless communication apparatuses 10A and 10B (step S206). When receiving the normal radio frame from the opposite side active mode wireless communication apparatus 10C, the switching control unit 103 of the wireless communication apparatus 10B checks the apparatus ID multiplexed on this normal radio frame (step S207). In this regard, the apparatus ID "B" of the currently standby mode wireless communication apparatus 10B is multiplexed on the normal radio frame, and therefore the switching control unit 103 of the wireless communication apparatus 10B switches the own wireless communication apparatus 10B to the active mode (step S208). Meanwhile, the failure occurs in the wireless receiving unit 102 of the wireless communication apparatus 10A, and therefore the wireless communication apparatus 10A does not receive the normal radio frame transmitted from the wireless communication apparatus 10C in step S206. Hence, the switching control unit 103 of the wireless communication apparatus 10A switches the own wireless communication apparatus 10A to the standby mode after a preset time passes since detection of the occurrence of the failure in the wireless receiving unit 102 of the wireless communication apparatus 10A (step S209). In this regard, a timing to switch the wireless communication apparatus 10A to the standby mode is arbitrary and may be, for example, a timing immediately after detection of the occurrence of the failure of the wireless receiving unit 102.

As described above, when the failure occurs in the wireless receiving unit 102 of the active mode wireless communication apparatus 10A, it is possible to switch the wireless communication apparatus 10A to the standby mode and switch the wireless communication apparatus 10B to the active mode.

(C) Operation in Case where Failure Occurs in Radio Link

Figure 9:
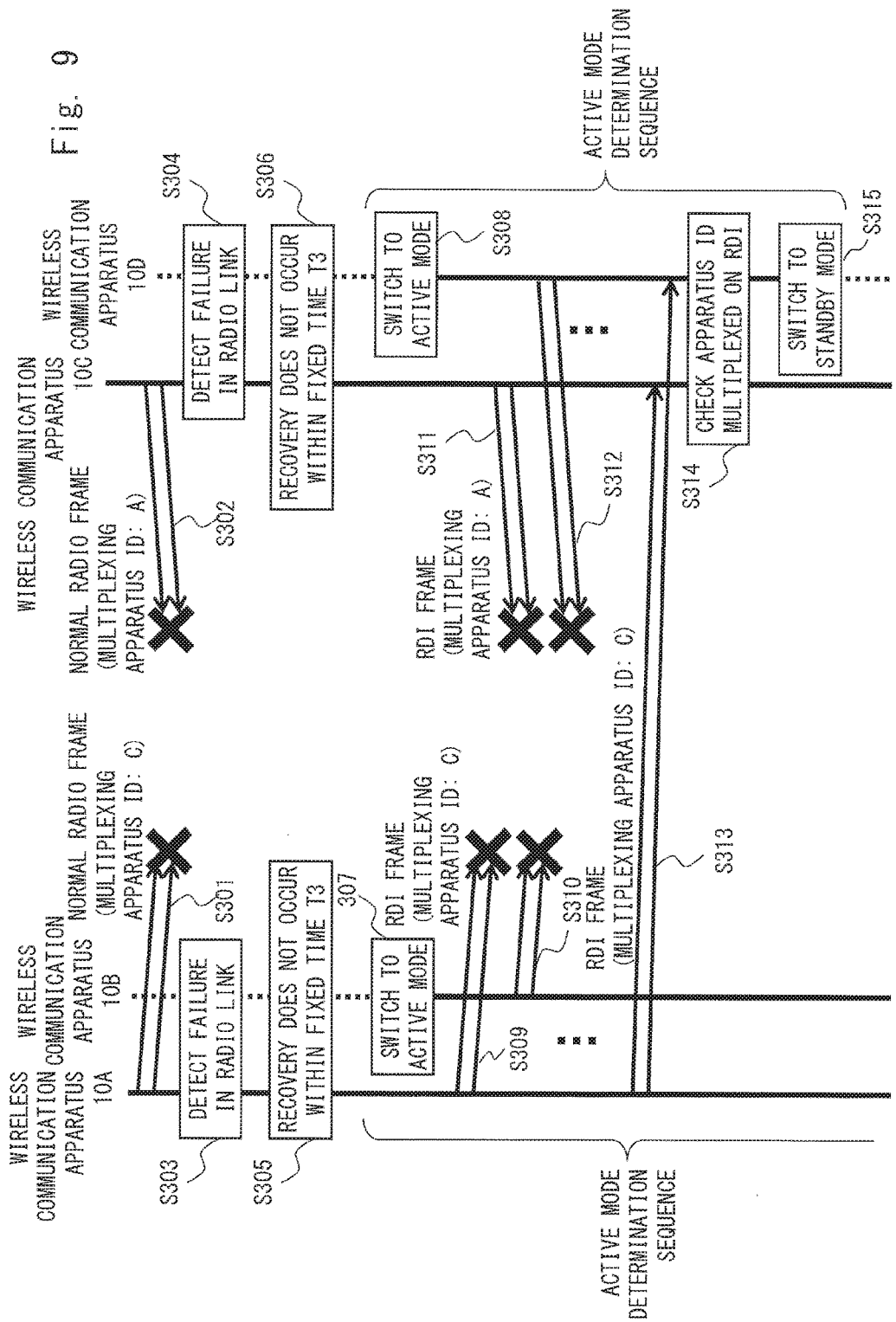
FIG. 9 is a sequence chart illustrating an operation example in case where a failure occurs in a radio link in a wireless communication system according to a second embodiment.
Figure 10:
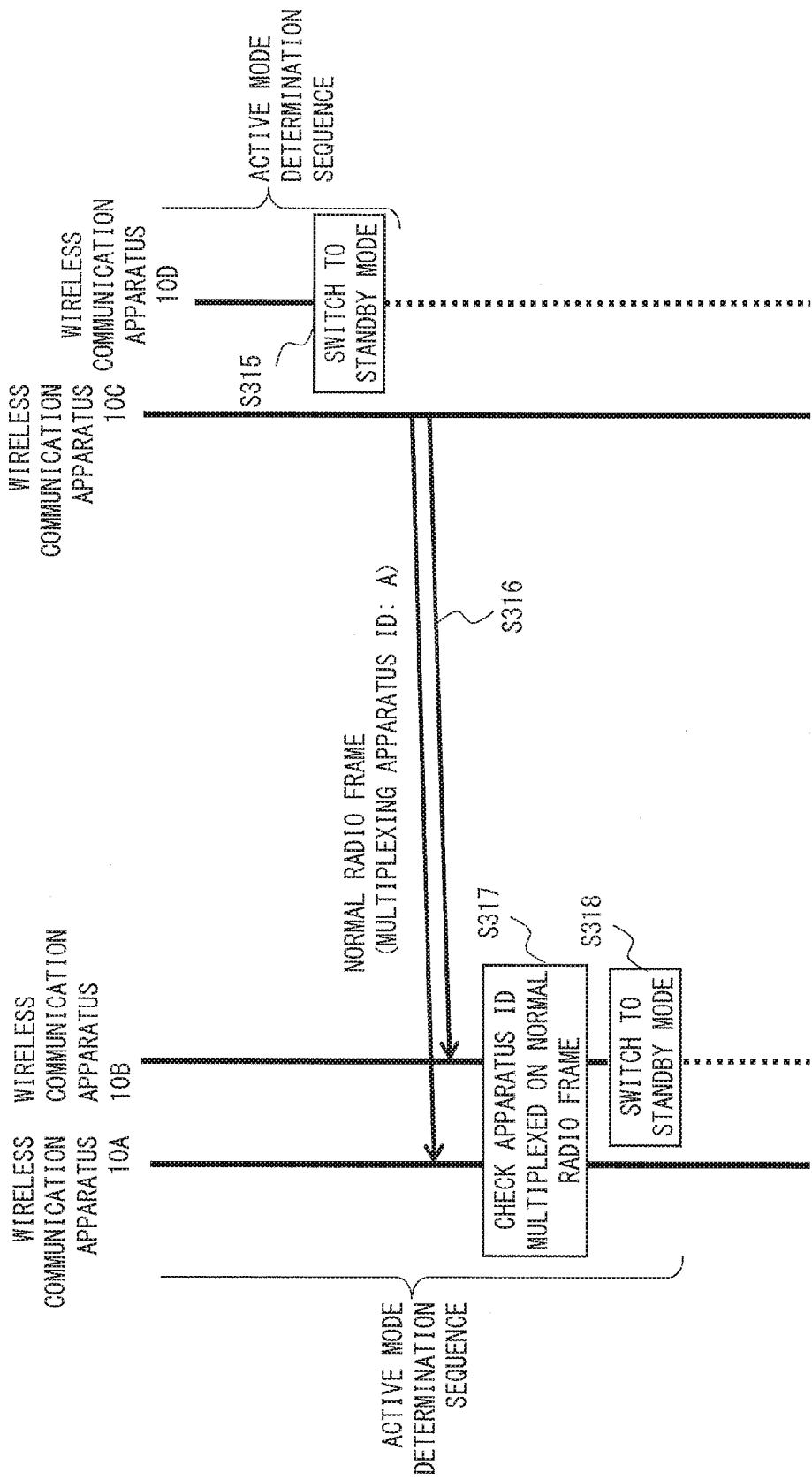
FIG. 10 is a sequence chart illustrating an operation example in case where a failure occurs in a radio link in a wireless communication system according to a second embodiment.
Figure 11:
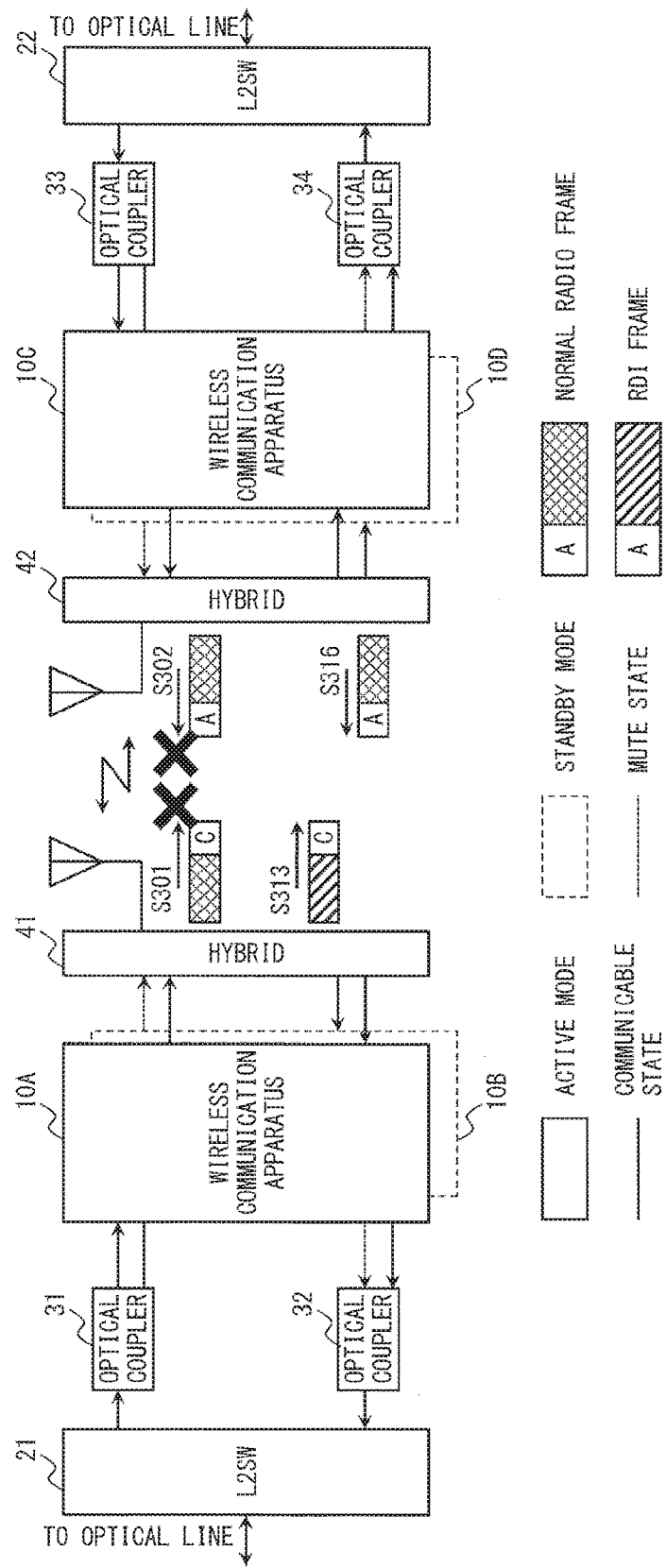
FIG. 11 is a sequence chart illustrating an operation example in case where a failure occurs in a radio link in a wireless communication system according to a second embodiment.

The failure of the radio link occurs when, for example, a shield is placed before an antenna of the wireless communication apparatus 10. FIGS. 9 to 11 illustrate operation examples where the failure occurs in the radio link under the situation that the wireless communication apparatuses 10A and 10C are in the active mode and the wireless communication apparatuses 10B and 10D are in the standby mode. In this regard, FIGS. 9 and 10 illustrate that processing in FIG. 10 is performed subsequently to processing in FIG. 9, and step S315 in FIGS. 9 and 10 indicates the same step.

Referring to FIGS. 9 to 11, the wireless transmitting unit 101 of the currently active mode wireless communication apparatus 10A transmits the normal radio frame on which the apparatus ID "C" of the currently opposite side active mode wireless communication apparatus 10C is multiplexed, to the opposite side wireless communication apparatuses 10C and 10D (step S301). Further, the wireless transmitting unit 101 of the currently active mode wireless communication apparatus 10C transmits the normal radio frame on which the apparatus ID "A" of the currently opposite side active mode wireless communication apparatus 10A is multiplexed, to the opposite side wireless communication apparatuses 10A and 10B (step S302). However, the failure occurs in the radio link, and the normal radio frame transmitted from the wireless communication apparatus 10A in step S301 does not reach the wireless communication apparatuses 10C and 10D. Further, the normal radio frame transmitted from the wireless communication apparatus 10C in step S302 does not reach the wireless communication apparatuses 10A and 10B.

The switching control unit 103 of each of the wireless communication apparatuses 10A to 10D detects the failure of the radio link (steps S303 and S304). Then, the switching control unit 103 of each of the wireless communication apparatuses 10A to 10D decides whether or not the failure has recovered within a preset fixed time T3 (T2<T1<T3) after detection of the failure of the radio link (steps S305 and S306). In this case, the failure does not recover within the fixed time T3. Hence, the switching control unit 103 of each of the wireless communication apparatuses 10B and 10D switches each of the own wireless communication apparatuses 10B and 10D to the active mode (steps S307 and S308). Thus, a state transitions to the both mode active state where the wireless communication apparatuses 10A and 10B are both in the active mode, and the wireless communication apparatuses 10C and 10D are both in the active mode. Hence, the wireless transmitting unit 101 of each of the wireless communication apparatuses 10A and 10B transmits the RDI frame to the opposite side wireless communication apparatuses 10C and 10D (steps S309 and S310). The apparatus ID to be multiplexed on this RDI frame can be set in advance, and the apparatus ID "C" of the wireless communication apparatus 10C which has been in the active mode before the occurrence of the failure at the opposite side is multiplexed on the RDI frame. Further, the wireless transmitting unit 101 of each of the wireless communication apparatuses 10C and 10D transmits the RDI frame to the opposite side wireless communication apparatuses 10A and 10B (steps S311 and S312). The apparatus ID to be multiplexed on this RDI frame can be set in advance, and the apparatus ID "A" of the wireless communication apparatus 10A which has been in the active mode before the occurrence of the failure at the opposite side is multiplexed on the RDI frame.

Thus, when the failure occurs in the radio link, the wireless communication apparatuses 10A and 10B both transmit the RDI frames during downlink communication. However, during the occurrence of the failure of the radio link, these RDI frames do not reach the opposite side wireless communication apparatuses 10C and 10D. Hence, the RDI frames reach the opposite side wireless communication apparatuses 10C and 10D after recovery of the failure of the radio link. However, even when the failure of the radio link recovers, if transmission timings of the wireless communication apparatuses 10A and 10B to transmit the RDI frames are the same, the RDI frame collide against each other. As a result, both of the RDI frames do not reach the opposite side wireless commutation apparatuses 10C and 10D. Then, although the failure of the radio link recovers, the wireless communication apparatuses 10C and 10D cannot receive the RDI frames, and cannot decide which one of the wireless communication apparatuses 10A and 10B is in the active mode. Therefore, the both mode active state continues. Further, even when RDI frames are configured to be switched to normal radio frames at a point of time of recovery from the failure of the radio link, the normal radio frames are likely to collide against each other. The same problem could occur during uplink communication, too.

Figure 12:
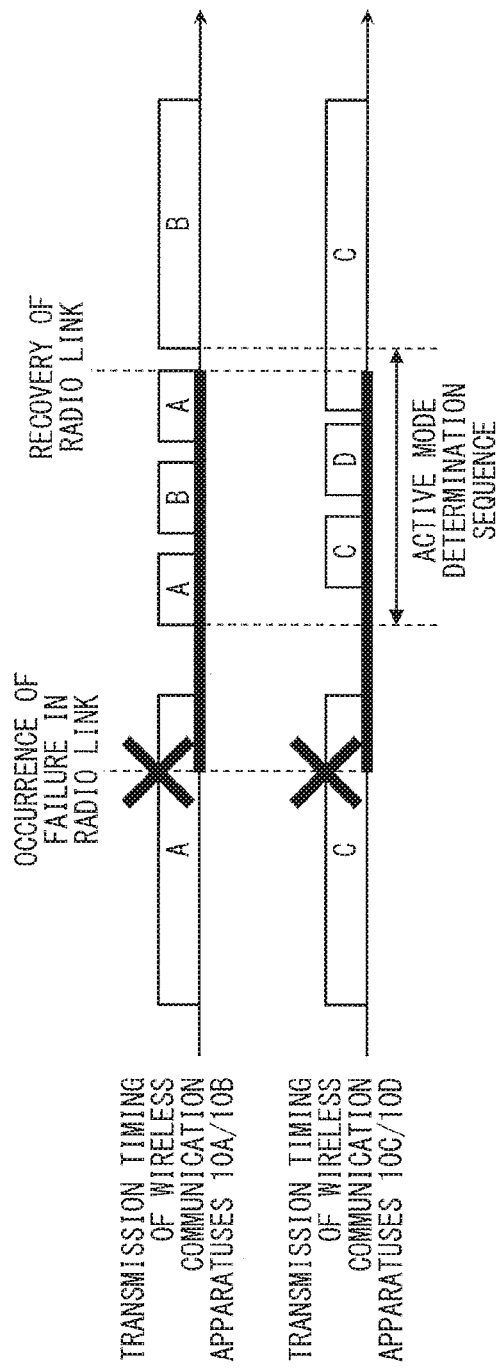
FIG. 12 is a view illustrating an example of a radio frame transmission timing of each wireless communication apparatus in case where a failure occurs in a radio link in a wireless communication system according to a second embodiment.

Hence, in the present embodiment, when the failure occurs in the radio link, an active mode determination sequence is executed. According to the active mode determination sequence, radio frame transmission timings of the active mode wireless communication apparatuses 10A and 10B are determined in advance to cause the wireless communication apparatuses 10A and 10B to alternately transmit the radio frames. Further, radio frame transmission timings of the active mode wireless communication apparatuses 10C and 10D are determined in advance to cause the wireless communication apparatuses 10C and 10D to alternately transmit the radio frames. FIG. 12 illustrates an example of a radio frame transmission timing. In this regard, in FIG. 12, letters on a time domain indicate the apparatus IDs of the wireless communication apparatuses 10 which perform transmission at this point of time. Referring to FIG. 12, in case of the wireless communication apparatuses 10A and 10B, for example, the wireless communication apparatus 10A which has been in the active mode during the occurrence of the failure of the radio link continues transmitting radio frames in the active mode during the preset time even after the occurrence of the failure. In this regard, the radio frames are transmitted as normal radio frames before the occurrence of the failure and as RDI frames after the occurrence of the failure. Further, when the failure of the radio link does not recover within the preset fixed time T3 after the occurrence of the failure, the wireless communication apparatus 10B is also switched to the active mode. Hence, the wireless communication apparatuses 10A and 10B both transmit RDI frames. In this regard, radio frame transmission timings of the wireless communication apparatuses 10A and 10B are determined in advance, and therefore the wireless communication apparatuses 10A and 10B alternately transmit RDI frames. Further, when the failure of the radio link subsequently recovers, what is transmitted at this point of this is the RDI frame of the wireless communication apparatus 10A. Therefore, the opposite side wireless communication apparatuses 10C and 10D receive this RDI frame, the wireless communication apparatus 10C of the apparatus ID "C" multiplexed on this RDI frame continues to be in the active mode and the other wireless communication apparatus 10D switches to the standby mode. Thus, by determining the transmission timings of the wireless communication apparatuses 10A and 10B in advance, it is possible to avoid collision between the RDI frames (or normal radio frames) from the wireless communication apparatuses 10A and 10B after recovery from the failure. In this regard, radio frame transmission timings of the wireless communication apparatus 10C and 10D are also the same.

Referring to FIGS. 9 to 11 again, the wireless transmitting unit 101 of each of the wireless communication apparatuses 10A and 10B alternately transmits RDI frames in steps S309 and S310. Hence, it is possible to avoid collision between the RDI frames transmitted from the wireless communication apparatus 10A and 10B after recovery from the failure of the radio link, and a RDI frame transmitted immediately after the recovery is received by the opposite side wireless communication apparatuses 10C and 10D first. Similarly, the wireless transmitting unit 101 of each of the wireless communication apparatus 10C and 10D alternately transmits RDI frames in steps S311 and S312. Hence, it is possible to avoid collision between the RDI frames transmitted from the wireless communication apparatuses 10C and 10D after recovery from the failure of the radio link, and a RDI frame transmitted immediately after the recovery is received by the opposite side wireless communication apparatus 10A and 10B first. In this regard, what arrives the opposite side the earliest after the recovery from the failure of the radio link is the RDI frame transmitted by the wireless communication apparatus 10A (step S313). In this case, when receiving the RDI frame from the opposite side wireless communication apparatus 10A, the switching control unit 103 of each of the wireless communication apparatuses 10C and 10D checks the apparatus ID multiplexed on this RDI frame (step S314). In this case, the apparatus ID "C" of the wireless communication apparatus 10C is multiplexed on the RDI frame, and therefore the switching control unit 103 of the wireless communication apparatus 10D switches the own wireless communication apparatus 10D to the standby mode (step S315). By this means, the both mode active state at the side of the wireless communication apparatuses 10C and 10D is resolved. Hence, only the wireless communication apparatus 10C subsequently transmits the normal radio frame switched from the RDI frame to the wireless communication apparatuses 10A and 10B (step S316). When receiving the normal radio frame from the opposite side wireless communication apparatus 10C, the switching control unit 103 of each of the wireless communication apparatuses 10A and 10B checks the apparatus ID multiplexed on this normal radio frame (step S317). In this regard, the apparatus ID "A" of the wireless communication apparatus 10A is multiplexed on the normal radio frame, and therefore the switching control unit 103 of the wireless communication apparatus 10B switches the own wireless communication apparatus 10B to the standby mode (step S318). By this means, the both mode active state is resolved at the side of the wireless communication apparatuses 10A and 10B, too.

As described above, when a failure occurs in a radio link, both of the side of the wireless communication apparatuses 10A and 10B and the side of the wireless communication apparatus 10C and 10D transition to the both mode active state. However, it is possible to avoid collision between radio frames after recovery from the failure, so that it is possible to receive a radio frame at the opposite side and resolve the both mode active state.

(2-2-2) Operation of Wireless Communication Apparatuses 10A to 10D (A) Operation in Case of Active Mode Wireless Communication Apparatus FIG. 13 illustrates an operation example where the wireless communication apparatus 10 is in the active mode. Referring to FIG. 13, the switching control unit 103 first decides whether or not an occurrence of a radio failure has been detected (step S401). The radio failure refers to a failure of the wireless transmitting unit 101 of the opposite side active mode wireless communication apparatus 10, a failure of the wireless receiving unit 102 of the wireless communication apparatus 10 and a failure of the radio link (the same applies to subsequent FIG. 14). When the radio failure is detected in step S401 (Yes in step S401), the wireless transmitting unit 101 transmits the RDI frame to the opposite side active mode and standby mode wireless communication apparatuses 10 (step S402). The apparatus ID of the wireless communication apparatus 10 which has been in the active mode before the occurrence of the failure at the opposite side is multiplexed on this RDI frame. Subsequently, the switching control unit 103 decides whether or not the radio failure has recovered within the preset fixed time T1 after detection of the occurrence of the radio failure (step S403). When the radio failure recovers within the fixed time T1 in step S403 (No in step S403), the switching control unit 103 keeps the active mode of the own wireless communication apparatus 10 (step S408). Meanwhile, when the radio failure does not recover within the fixed time T1 in step S403 (Yes in step S403), the switching control unit 103 changes the apparatus ID multiplexed on the RDI frame to the apparatus ID of the wireless communication apparatus 10 which has been in the standby mode before the occurrence of the failure at the opposite side, and the wireless transmitting unit 101 transmits this RDI frame to the opposite side active mode and standby mode wireless communication apparatus 10 (step S404). Subsequently, the switching control unit 103 decides whether or not the radio failure has recovered within the preset fixed time T3 (T1<T3) after detection of the occurrence of the radio failure (step S405). When the radio failure recovers within the fixed time T3 in step S405 (No in step S405), the wireless transmitting unit 101 transmits the normal radio frame to the opposite side active mode and standby mode wireless communication apparatuses 10. In this case, that the opposite side can receive the RDI frame transmitted in step S404 means that the active mode wireless communication apparatus 10 is switched (step S407). Meanwhile, when the radio failure does not recover within the fixed time T3 in step S405 (Yes in step S405), the above active mode determination sequence is performed (step S406).

Further, when the occurrence of the radio failure is not detected in step S401 (No in step S401), the switching control unit 103 decides whether or not the RDI frame has been received from the opposite side active mode wireless communication apparatus 10 (step S409). When the RDI frame is received in step S409 (Yes in step S409), the switching control unit 103 decides whether or not the apparatus ID multiplexed on the received RDI frame matches with the apparatus ID of the own wireless communication apparatus 10 (step S410). When the apparatus IDs do not match in step S410 (No in step S410), the switching control unit 103 switches the own wireless communication apparatus 10 to the standby mode (step S415). Meanwhile, when the apparatus IDs match in step S410 (Yes in step S410), the switching control unit 103 decides whether or not the radio failure has recovered within the preset fixed time T2 (T2<T1<T3) after detection of the radio failure in response to reception of the RDI frame in step S409 (step S411). In case where the radio failure has recovered within the fixed time T2 in step S411 (No in step S411), the switching control unit 103 keeps the active mode of the own wireless communication apparatus 10 (step S414). Meanwhile, when the radio failure does not recover within the fixed time T2 in step S411 (Yes in step S411), the switching control unit 103 changes the apparatus ID to be multiplexed on the normal radio frame, to the apparatus ID of the wireless communication apparatus 10 which has been in the standby mode before the occurrence of the failure at the opposite side, and the wireless transmitting unit 101 transmits this normal radio frame to the opposite side active mode and standby mode wireless communication apparatuses 10 (step S412). When the opposite side can receive the normal radio frame transmitted in step S412, the active mode wireless communication apparatus 10 is switched (step S413).

Further, when the RDI frame is not received in step S409 (No in step S409), the switching control unit 103 decides whether or not the apparatus ID multiplexed on the normal radio frame received from the opposite side active mode wireless communication apparatus 10 matches with the apparatus ID of the own wireless communication apparatus 10 (step S416). When the apparatus IDs do not match in step S416 (No in step S416), the switching control unit 103 switches the own wireless communication apparatus 10 to the standby mode (step S418). Meanwhile, when the apparatus IDs match in step S416 (Yes in step S416), the switching control unit 103 keeps the active mode of the own wireless communication apparatus 10 (step S417).

In this regard, in step S404, the apparatus ID to be multiplexed on the RDI frame has been changed. However, when the radio failure is the failure of the radio link, the RDI frame in steps S402 and S404 is not received at the opposite side, and therefore the apparatus ID may not be changed and may be left unchanged.

(B) Operation in Case of Standby Mode

FIG. 14 illustrates an operation example where the wireless communication apparatus 10 is in the standby mode. Referring to FIG. 14, the switching control unit 103 decides whether or not an occurrence of a radio failure has been detected (step S501). In case where the occurrence of the radio failure has been detected in step S501 (Yes in step S501), the switching control unit 103 decides whether or not the radio failure has recovered within the preset fixed time T3 after detection of the radio failure (step S502). In case where the radio failure has recovered within the fixed time T3 in step S502 (No in step S502), the switching control unit 103 keeps the standby mode of the own wireless communication apparatus 10 (step S504). Meanwhile, when the radio failure does not recover within the fixed time T3 in step S502 (Yes in step S502), the above active mode determination sequence is performed (step S503).

Further, when the occurrence of the radio failure is not detected in step S501 (No in step S501), the switching control unit 103 decides whether or not the RDI frame has been received from the opposite side active mode wireless communication apparatus 10 (step S505). When the RDI frame is received in step S505 (Yes in step S505), the switching control unit 103 decides whether or not the apparatus ID multiplexed on the received RDI frame matches with the apparatus ID of the own wireless communication apparatus 10 (step S506). When the apparatus IDs do not match in step S506 (No in step S506), the switching control unit 103 keeps the standby mode of the own wireless communication apparatus 10 (step S508). Meanwhile, when the apparatus IDs match in step S506 (Yes in step S506), the own wireless communication apparatus 10 is switched to the active mode (step S507).

Further, when the RDI frame is not received in step S505 (No in step S505), the switching control unit 103 decides whether or not the apparatus ID multiplexed on the normal radio frame received from the opposite side active mode wireless communication apparatus 10 matches with the apparatus ID of the own wireless communication apparatus (step S509). When the apparatus IDs do not match in step S509 (No in step S509), the switching control unit 103 keeps the standby mode of the own wireless communication apparatus 10 (step S511). Meanwhile, when the apparatus IDs match in step S509 (Yes in step S509), the switching control unit 103 switches the own wireless communication apparatus 10 to the active mode (step S510).

(2-3) Effect According to Second Embodiment

As described above, in the present embodiment, each of the wireless communication apparatuses 10A to 10D transmits the radio frame on which the apparatus ID of the active mode wireless communication apparatus 10 at the opposite side is multiplexed, to the opposite side active mode and standby mode wireless communication apparatuses 10 based on the failure occurrence status of the opposite side active mode wireless communication apparatus 10 under the situation that each of the own wireless communication apparatuses 10A to 10D is in the active mode. Further, each of the wireless communication apparatuses 10A to 10D switches each of the own wireless communication apparatuses 10A to 10D to the active mode or the standby mode based on the apparatus ID multiplexed on the radio frame received from the opposite side active mode wireless communication apparatus 10. Consequently, unlike the technique disclosed in Patent Literature 1, it is possible to provide an effect that it is possible to switch between the active mode and the standby mode of the wireless communication apparatuses 10A to 10D without providing the dedicated controller outside the wireless communication apparatuses 10A to 10D. Further, the dedicated controller is unnecessary, so that it is possible to simplify the system configuration and reduce cost of the entire system. Furthermore, the dedicated controller is unnecessary and it is not necessary to dispose the wireless communication apparatus 10 near an external apparatus of the controller, so that it is also possible to reduce restrictions in terms of mounting.

Still further, in the present embodiment, the radio frame transmission timings of the wireless communication apparatuses 10A and 10B in case where a failure occurs in the radio link and a transition to the both mode active state occurs are determined in advance to cause the wireless communication apparatuses 10A and 10B to alternately transmit radio frames. Similarly, the radio frame transmission timings of the wireless communication apparatuses 10C and 10D are determined in advance to cause the wireless communication apparatuses 10C and 10D to alternately transmit radio frames. Consequently, it is possible to avoid collision between the radio frames from the wireless communication apparatuses 10A and 10B and to avoid collision between the radio frames from the wireless communication apparatuses 10C and 10D after recovery from the failure of the radio link and, consequently, it is possible to receive the radio frames at the opposite side and resolve the both mode active state.

Further, in the present embodiment, when detecting an occurrence of a failure, the wireless communication apparatuses 10A to 10D multiplex the apparatus IDs on RDI frames and transmit the RDI frames. Consequently, it is possible to provide an effect that it is possible to notify the opposite side wireless communication apparatus 10 of a failure occurrence alarm.

The present invention has been described above with reference to the embodiments. However, the present invention is not limited to the above embodiments. Various changes which one of ordinary skill in the art can understand are applicable to the configurations and the details of the present invention within the scope of the present invention. For example, according to the above embodiments, it is not necessary to provide the dedicated controller outside the wireless communication apparatuses 10A to 10D, so that it is possible to dispose the wireless communication apparatuses 10A to 10D separately from the L2SWs 21 and 22. Consequently, it is possible to employ a configuration where the components other than the L2SWs 21 and 22 among the components of the wireless communication system illustrated in FIG. 3 are disposed outdoor.

This application claims priority to Japanese Patent Application No. 2015-029316 filed on Feb. 18, 2015, the entire contents of which are incorporated by reference herein.

REFERENCE SIGNS LIST 10A to 10D wireless communication apparatus
101 wireless transmitting unit
102 wireless receiving unit
103 switching control unit
104 optical receiving unit
105 radio frame multiplexing unit
106 radio frame extracting unit
107 optical transmitting unit
21, 22 L2SW
31 to 34 optical coupler
41, 42 hybrid

What is claimed is:
1. A wireless communication system comprising:
first and second wireless communication apparatuses that are switched to one of an active mode and a standby mode so that at least one of the first and second wireless communication apparatuses is in the active mode; and
third and fourth wireless communication apparatuses that are connected to the first and second wireless communication apparatuses via a radio link and are switched to one of the active mode and the standby mode so that at least one of the third and fourth wireless communication apparatuses is in the active mode, wherein
under a situation that the first wireless communication apparatus is in the active mode and that the second wireless communication apparatus is in the standby mode, when the first and second wireless communication apparatuses detect an occurrence of a failure of the radio link, if the failure of the radio link does not recover within a preset time, the second wireless communication apparatus switches to the active mode and the first wireless communication apparatus stays in the active mode, under a situation that the third wireless communication apparatus is in the active mode and that the fourth wireless communication apparatus is in the standby mode, when the third and fourth wireless communication apparatuses detect an occurrence of the failure of the radio link, if the failure of the radio link does not recover within a preset time, the fourth wireless communication apparatus switches to the active mode and the third wireless communication apparatus stays in the active mode, and a transmission timing of a switch instruction, instructing the wireless communication apparatus in the active mode from among the third and fourth wireless communication apparatuses, in a case of the occurrence of the failure of the radio link is determined in advance to cause the first and second wireless communication apparatuses to alternately transmit the switch instruction, and transmission timing of the switch instruction, instructing the wireless communication apparatus in the active mode from among the first and second wireless communication apparatuses, in a case of the occurrence of the failure of the radio link is determined in advance to cause the third and fourth wireless communication apparatuses to alternately transmit the switch instruction.

2. The wireless communication system according to claim 1, wherein under a situation that the first and third wireless communication apparatuses are in the active mode and that the second and fourth wireless communication apparatuses are in the standby mode, when the first wireless communication apparatus detects an occurrence of a failure in the third wireless communication apparatus, if the failure in the third wireless communication apparatus does not recover within a preset time, the first wireless communication apparatus transmits the switch instruction for instructing the fourth wireless communication apparatus to be the active mode wireless communication apparatus.

3. The wireless communication system according to claim 1, wherein, when a recovery from the failure in the radio link is detected, each of the first and second wireless communication apparatuses is switched to one of the active mode and the standby mode based on the switch instruction subsequently received from the wireless communication apparatus in the active mode from among the third and fourth wireless communication apparatuses, and each of the third and fourth wireless communication apparatuses is switched to one of the active mode and the standby mode based on the switch instruction subsequently received from the wireless communication apparatus in the active mode from among the first and second wireless communication apparatuses.

4. The wireless communication system according to claim 1, wherein each of the first and second wireless communication apparatuses includes a wireless transmitting unit that transmits the switch instruction to the third and fourth wireless communication apparatuses, and a wireless receiving unit that receives the switch instruction from the wireless communication apparatus in the active mode from among the third and fourth wireless communication apparatuses, and each of the third and fourth wireless communication apparatuses includes a wireless transmitting unit that transmits the switch instruction to the first and second wireless communication apparatus, and a wireless receiving unit that receives the switch instruction from the wireless communication apparatus in the active mode from among the first and second wireless communication apparatuses, under a situation that the first and third wireless communication apparatuses are in the active mode and that the second and fourth wireless communication apparatuses are in the standby mode, the first wireless communication apparatus transmits the switch instruction by using a specific frame for giving notification of a failure when an occurrence of the failure in the wireless receiving unit of the first wireless communication apparatuses is detected, and the third and fourth wireless communication apparatuses decide the failure has occurred in the first wireless communication apparatus when the switch instruction from the specific frame from the first wireless communication apparatus is received.

5. The wireless communication system according to claim 1, wherein each of the first and second wireless communication apparatuses includes a wireless transmitting unit that transmits the switch instruction to the third and fourth wireless communication apparatuses, and a wireless receiving unit that receives the switch instruction from the wireless communication apparatus in the active mode from among the third and fourth wireless communication apparatuses, and wherein each of the third and fourth wireless communication apparatuses includes a wireless transmitting unit that transmits the switch instruction to the first and second wireless communication apparatuses, and a wireless receiving unit that receives the switch instruction from the wireless communication apparatus in the active mode from anon the first and second wireless communication apparatuses, and the third and fourth wireless communication apparatuses decide that a failure has occurred in the first wireless communication apparatus when a preset time passes after the switch instruction is lastly received from the first wireless communication apparatus and when the failure has not occurred in the wireless receiving unit of each of the third and fourth wireless communication apparatuses.

6. The wireless communication system according to claim 1, wherein each of the first to fourth wireless communication apparatuses is disposed outdoors.

7. A first wireless communication apparatus comprising:
a switching control unit,
a wireless transmitting unit, and
a wireless receiving unit,
the first wireless communication apparatus is redundantly configured with second, third, and fourth wireless communication apparatuses and is connected to the second, third, and fourth wireless communication apparatuses via a radio link,
the third and fourth wireless communication apparatuses being switched to one of an active mode and a standby mode so that at least one of the third and fourth wireless communication apparatuses is in the active mode, the third and fourth wireless communication apparatuses being configured such that when the third wireless communication apparatus is in the active mode and that the fourth wireless communication apparatus is in the standby mode, and when the third and fourth wireless communication apparatuses detect an occurrence of a failure of the radio link, if the failure of the radio link does not recover within a preset time, the fourth wireless communication apparatus switches to the active mode and the third wireless communication apparatus stays in the active mode, the first wireless communication apparatus is configured to be switched to one of the active mode and the standby mode, such that at least one of the first and second wireless communication apparatuses is in the active mode, the switching control unit is configured to detects an occurrence of a failure of the radio link, and is further configured to, when a failure of the radio, link is detected, and the failure of the radio link does not recover within a preset time, instruct the first wireless communication apparatus to remain in the active mode, and prepare a switch instruction to instruct the second wireless communication apparatus to switch to the active mode, the wireless transmitting unit being configured to, send the switch instruction to the second wireless communication apparatus, the wireless receiving unit being configured to receive the switching instruction from any one of the second, third, and fourth wireless communication apparatus, and the switching control unit, the wireless transmitting unit, and the wireless receiving unit being configured such that a transmission timing of the switch instruction, instructing the wireless communication apparatus in the active mode from among the third and fourth wireless communication apparatuses, in a case of the occurrence of the failure of the radio link is determined in advance to, cause the first and second wireless communication apparatuses to alternately transmit the switch instruction, and transmission timing of the switch instruction, instructing the wireless communication apparatus in the active mode from among the first and second wireless communication apparatuses, in a case of the occurrence of the failure of the radio link is determined in advance to, cause the third and fourth wireless communication apparatuses to alternately transmit the switch instruction.

8. The first wireless communication apparatus according to claim 7, wherein
under a situation that the first and third wireless communication apparatuses are in the active mode and that the second and fourth wireless communication apparatuses are in the standby mode,
the switching control unit is further configured to detect an occurrence of a failure in the third wireless communication apparatus if the failure in the third wireless communication apparatus does not recover within a preset time, cause the wireless transmitting unit to transmit the switch instruction for instructing the fourth wireless communication apparatus to be in the active mode.

9. The first wireless communication apparatus according to claim 7, wherein, when a recovery from the failure in the radio link is detected, the switching control unit is configured to respectively instruct and prepare instructions for causing the first wireless communication apparatus and the second wireless communication apparatus to switch to one of the active mode and the standby mode based on the switch instruction subsequently received from the wireless communication apparatus in the active mode from among the third and fourth wireless communication apparatus, and each of the third and fourth wireless communication apparatuses is configured to be switched to one of the active mode and the standby mode based on the switch instruction subsequently received from the wireless communication apparatus in the active mode from among the first and second wireless communication apparatuses.

10. The first wireless communication apparatus according to claim 7, wherein,
the wireless transmitting unit is configured to transmits the switch instruction to the third and fourth wireless communication apparatuses, and the second,
under a situation that the first and third wireless communication apparatuses are in the active mode and that the second and fourth wireless communication apparatuses are in the standby mode, the first wireless communication apparatus transmits via the wireless transmitting unit the switch instruction by using a specific frame for giving notification of a failure when an occurrence of the failure in the wireless receiving unit is detected, and the third and fourth wireless communication apparatuses decide
that the failure has occurred in the first wireless communication apparatus when the switch instruction from the specific frame from the first wireless communication apparatus is received.

11. The first wireless communication apparatus according to claim 7, the first wireless communication apparatus is configured to be configured with the second, third, and fourth wireless communication apparatuses, such that the third and fourth wireless communication apparatuses decide that a failure has occurred in the first wireless communication apparatus when a preset time passes after the switch instruction is lastly received from the first wireless communication apparatus and when the failure has not occurred in wireless receiving units of each of the third and fourth wireless communication apparatuses.

12. The first wireless communication apparatus according to claim 7, wherein the wireless communication apparatus is disposed outdoors.

13. A wireless communication method of a wireless communication system that comprises:
first and second wireless communication apparatuses that are switched to one of an active mode and a standby mode so that at least one of the first and second wireless communication apparatuses is in the active mode; and
third and fourth wireless communication apparatuses that are connected to the first and second wireless communication apparatuses via a radio link, and are switched to one of the active mode and the standby mode so that at least one of the third and fourth wireless communication apparatuses is in the active mod, the wireless communication method comprising:
when the first wireless communication apparatus is in the active mode and the second wireless communication apparatus is in the standby mode, and when the first and second wireless communication apparatuses detect an occurrence of a failure of the radio link, if the failure of the radio link docs not recover within a preset time, transmitting a switch instruction via a radio link, the switch instruction instructing the second wireless communication apparatus to switch to the active mode and the first wireless communication apparatus to stay in the active mode,
when the third wireless communication apparatus is in the active mode and the fourth wireless communication apparatus is in the standby mode, and when the third and fourth wireless communication apparatuses detect an occurrence of the failure of the radio link, if the failure of the radio link does not recover within a preset time, transmitting a switch instruction via a radio link, the switch instruction instructing the fourth wireless communication apparatus to switch to the active mode and the third wireless communication apparatus to stay in the active mode, and wherein a transmission timing of the switch instruction instructing the wireless communication apparatus in the active mode from among the third and fourth wireless communication apparatuses, in a case of the occurrence of the failure of the radio link is determined in advance to cause the first and second wireless communication apparatuses to alternately transmit the switch instruction, and transmission timing of the switch instruction, instructing the wireless communication apparatus in the active mode from among the first and second wireless communication apparatuses, in a case of the occurrence of the failure of the radio link is determined in advance to, cause the third and fourth wireless communication apparatuses to alternately transmit the switch instruction.

14. A wireless communication method of a first wireless communication apparatus comprising, a switching control unit, a wireless transmitting unit, and a wireless receiving unit, the first wireless communication apparatus is redundantly configured with second, third, and fourth wireless communication an apparatuses and is connected to the second, third, and fourth wireless communication apparatuses via a radio link, the method comprising:

transmitting a switch instruction instructing the second wireless communication apparatus to switch to an active mode and the first wireless communication apparatus to stay in the active mode when the first wireless communication apparatus is in the active mode and the second wireless communication apparatus is in the standby mode, and when the first and second wireless communication apparatuses detect an occurrence of a failure of the radio link, if the failure of the radio link doe not recover within a Preset time, transmitting a switch instruction instructing the fourth wireless communication apparatus to switch to the active mode and the third wireless communication apparatus to stay in the active mode when the third wireless communication apparatus is in the active mode and the fourth wireless communication apparatus is in the standby mode, and when the third and fourth wireless communication apparatuses detect an occurrence of the failure of the radio link, if the failure of the radio link does not recover within a preset time, and wherein a transmission timing of the switch instruction instructing the wireless communication apparatus in the active mode from among the third and fourth wireless communication apparatuses, in a case of the occurrence of the failure of the radio link is determined in advance to cause the first and second wireless communication apparatuses to alternately transmit the switch instruction, and transmission timing of the switch instructions, instructing the wireless communication apparatus in the active mode from among the first and second wireless communication apparatuses, in a case of the occurrence of the failure of the radio link is determined in advance to cause the third and fourth wireless communication apparatuses to alternately transmit the switch instruction.

* * * * *

UNITED STATES PATENT AND TRADEMARK OFFICE
CERTIFICATE OF CORRECTION

PATENT NO. : 10,484,896 B2
APPLICATION NO. : 15/547542
DATED : November 19, 2019
INVENTOR(S) : Satoshi Sonobe It is certified that error appears in the above-identified patent and that said Letters Patent is hereby corrected as shown below:

In the Specification

Column 5, Description of Embodiments, Line 46; After "a", delete "unit 102"

In the Claims

Column 20, Line 4; In Claim 4, delete "apparatus," and insert --apparatuses,-- therefor Column 20, Line 17; In Claim 4, after "decide", insert --that--

Column 20, Line 35; In Claim 5, delete "anon" and insert --among-- therefor

Column 20, Line 51; In Claim 7, after "unit,", insert --¶wherein,--

Column 21, Line 12; In Claim 7, delete "radio," and insert --radio-- therefor

Column 21, Line 19; In Claim 7, delete "to," and insert --to-- therefor

Column 21, Line 32; In Claim 7, delete "to," and insert --to-- therefor

Column 21, Line 39; In Claim 7, delete "to," and insert --to-- therefor

Column 21, Line 64; In Claim 9, delete "apparatus," and insert --apparatuses,-- therefor Column 22, Line 18; In Claim 10, after "decide", delete "¶"

Column 22, Line 48; In Claim 13, delete "mod," and insert --mode,-- therefor

Column 22, Line 55; In Claim 13, delete "docs" and insert --does-- therefor

Signed and Sealed this
Fifteenth Day of September, 2020

Andrei Iancu
*Director of the United States Patent and Trademark Office*

CERTIFICATE OF CORRECTION (continued)
U.S. Pat. No. 10,484,896 B2

Column 23, Line 17; In Claim 13, delete "to," and insert --to-- therefor

Column 23, Line 24; In Claim 14, after "unit,", insert --¶wherein,--

Column 23, Line 27; In Claim 14, before "apparatuses", delete "an"

Column 24, Line 7; In Claim 14, delete "doe" and insert --does-- therefor

Column 24, Line 7; In Claim 14, delete "Preset" and insert --preset-- therefor

Column 24, Line 25; In Claim 14, delete "instructions," and insert --instruction,-- therefor